United States Patent
Chetan et al.

(10) Patent No.: US 9,785,965 B2
(45) Date of Patent: Oct. 10, 2017

(54) CAMPAIGN MANAGEMENT CONSOLE

(71) Applicant: Microsoft Technology Licensing, LLC, Redmond, WA (US)

(72) Inventors: Kishan Chetan, Vancouver (CA); Jujhar Singh, Clyde Hill, WA (US); Ted Cyrek, Issaquah, WA (US); Nikola Jelisavac, Redmond, WA (US); Martin Kostal, Redmond, WA (US)

(73) Assignee: Mircosoft Technology Licensing, LLC, Redmond, WA (US)

( * ) Notice: Subject to any disclaimer, the term of this patent is extended or adjusted under 35 U.S.C. 154(b) by 274 days.

(21) Appl. No.: 14/175,773

(22) Filed: Feb. 7, 2014

(65) Prior Publication Data

US 2015/0227960 A1    Aug. 13, 2015

(51) Int. Cl.
    *G06Q 30/02* (2012.01)
(52) U.S. Cl.
    CPC ................ *G06Q 30/0242* (2013.01)
(58) Field of Classification Search
    CPC combination set(s) only.
    See application file for complete search history.

(56) References Cited

U.S. PATENT DOCUMENTS

| | | | |
|---|---|---|---|
| 7,006,979 B1 * | 2/2006 | Samra | G06Q 10/0635 235/375 |
| 7,424,439 B1 | 9/2008 | Fayyad et al. | |
| 8,099,316 B2 | 1/2012 | Moukas et al. | |
| 8,103,690 B2 * | 1/2012 | Seidl | G06Q 30/02 707/736 |
| 8,151,202 B1 | 4/2012 | Cronin et al. | |
| 8,151,203 B2 | 4/2012 | Runge et al. | |
| 8,352,307 B2 * | 1/2013 | Moukas | G06Q 10/0631 705/7.29 |
| 8,738,442 B1 * | 5/2014 | Liu | G06Q 30/0267 705/14.4 |
| 2003/0078830 A1 * | 4/2003 | Wagner | G06Q 10/06311 705/7.13 |
| 2004/0068435 A1 | 4/2004 | Braunzell | |
| 2004/0088208 A1 * | 5/2004 | Runge | G06Q 10/0633 705/7.31 |
| 2004/0254860 A1 | 12/2004 | Wagner et al. | |
| 2007/0143181 A1 | 6/2007 | Linkner et al. | |
| 2007/0271145 A1 * | 11/2007 | Vest | G06Q 30/02 705/14.41 |

(Continued)

OTHER PUBLICATIONS

Unica: Unica enhances its enterprise marketing management suite with improved field marketing solution, May 1, 2007, M2 Communications Ltd, p. 1-3.*

(Continued)

*Primary Examiner* — Fonya Long
*Assistant Examiner* — Marie Brady
(74) *Attorney, Agent, or Firm* — Christopher J. Volkmann; Kelly, Holt & Christenson, PLLC

(57) ABSTRACT

User interface displays are generated that have user input mechanism that receive campaign creation user inputs to create an automated campaign. The campaign is activated, and analytics components gather and generate performance information indicative of a performance of the created campaign. The performance data is displayed, for individual actions, and aggregated actions for user management of the campaign.

20 Claims, 28 Drawing Sheets

(56) References Cited

U.S. PATENT DOCUMENTS

| | | | |
|---|---|---|---|
| 2008/0313011 A1 | 12/2008 | Rose et al. | |
| 2009/0192869 A1 | 7/2009 | Irvine et al. | |
| 2009/0228572 A1 | 9/2009 | Wall et al. | |
| 2010/0217665 A1 | 8/2010 | Sharma | |
| 2011/0313805 A1* | 12/2011 | Heydemann | G06Q 10/06 705/7.14 |
| 2012/0116895 A1 | 5/2012 | Catalahana et al. | |
| 2014/0067521 A1* | 3/2014 | Kirkby | G06Q 30/02 705/14.42 |
| 2014/0100964 A1* | 4/2014 | Kramer | G06Q 30/02 705/14.66 |
| 2014/0279060 A1* | 9/2014 | Memarian | G06Q 30/0277 705/14.72 |
| 2015/0227961 A1 | 8/2015 | Chetan et al. | |

OTHER PUBLICATIONS

IBM Unica Campaign, Mar. 16, 2012, Version 8 Release 5,p. 1-228.*

"SAS Marketing Automation", Retrieved on: Nov. 20, 2013, Available at: http://www.sas.com/resources/factsheet/sas-marketing-automation-user-factsheet.pdf.

"Oracle Eloqua Marketing for Entertainment Cloud Service", Retrieved on: Nov. 20, 2013, Available at: http://www.eloqua.com/content/dam/eloqua/Downloads/datasheets/oracle-eloqua-marketing-for-entertainment-cloud-service-datasheet.pdf.

"Adobe® CQ Marketing Campaign Management", Retrieved on: Nov. 20, 2013, Available at: http://www.ndm.net/ecm/pdf/cq-marketing-campaign-management-datasheet.pdf.

"Campaign Management", Published on: Feb. 22, 2010, Available at: http://www.netsuite.com/portal/products/crm/marketing-automation/campaign.shtml.

"Marketing Automation Software", Retrieved on: Nov. 18, 2013, Available at: http://asia.marketo.com/software/marketing-automation.

"Genius User's Guide for Marketing Automation", Published on: Jul. 1, 2013, Available at: http://www.genius.com/media/pdfs/Genius_User's_Guide_for_Marketing_Automation_SFDC.pdf.

Raab, David, "Eloqua10 Offers a Much-Improved Interface and Revenue Reporting", Published on: Nov. 16, 2010, Available at: http://customerexperiencematrix.blogspot.in/2010/11/eloqua10-offers-much-improved-interface.html.

"Marketing Moves Fast. Move Faster with Autopilot", Retrieved on: Jan. 29, 2014, Available at: http://www.bislr.com/explore.

Prosecution History for U.S. Appl. No. 14/175,783 including: Non-Final Office Action dated Mar. 1, 2016, Response to Notice to File Corrected Application Papers dated Apr. 8, 2014, and Notice to File Corrected Application Papers dated Feb. 27, 2014, 37 pages.

"X2Flow—Modern Marketing", Retrieved Date: Jan. 29, 2014, Available at: http://wwwx2engine.com/marketing/x2flow/.

"The Big Easy Guidebook to Marketing Automation", Published on: Jan. 23, 2014, Available at: http://www.marketo.com/_assets/uploads/big-easy-guidebook.pdf.

"Campaign Management", Retrieved Date: Jan. 29, 2014, Available at: http://www.tripolis.com/wp-content/uploads/2011/12/Campaign_management_UK.pdf.

* cited by examiner

CAMPAIGN MANAGEMENT CONSOLE

BACKGROUND

Computer systems are currently in wide use. Many companies or organizations make use of computers in a variety of ways, including using computer systems to perform marketing activities.

Many organizations perform marketing activities that attempt to identify leads (or prospects). The leads are individuals or organizations that are identified as being likely to buy the goods or services of the organization that is performing the marketing activities. For instance, the leads can be scored, based on certain parameters, and the higher scoring leads (or prospects) can be identified as a market segment to which the organization may direct certain marketing activities.

Some marketing campaigns can become very complex. Often, multiple different types of marketing actions are attempted, and they may vary across different communication channels. For instance, the actions can include emails, phone calls, social network actions and others. The marketing organization may also wish to manage the marketing activities to ensure that the marketing message is consistent, across all touch points (such as e-mail, social networks, on-line touch points on the company's website, mobile communications, etc.). In addition, as the number of prospects grows, it can be very difficult to perform follow ups with those prospects.

The discussion above is merely provided for general background information and is not intended to be used as an aid in determining the scope of the claimed subject matter.

SUMMARY

User interface displays are generated that have user input mechanism that receive campaign creation user inputs to create an automated campaign. The campaign is activated, and analytics components gather and generate performance information indicative of a performance of the created campaign. The performance data is displayed, for individual actions and aggregated actions, for user management of the campaign.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
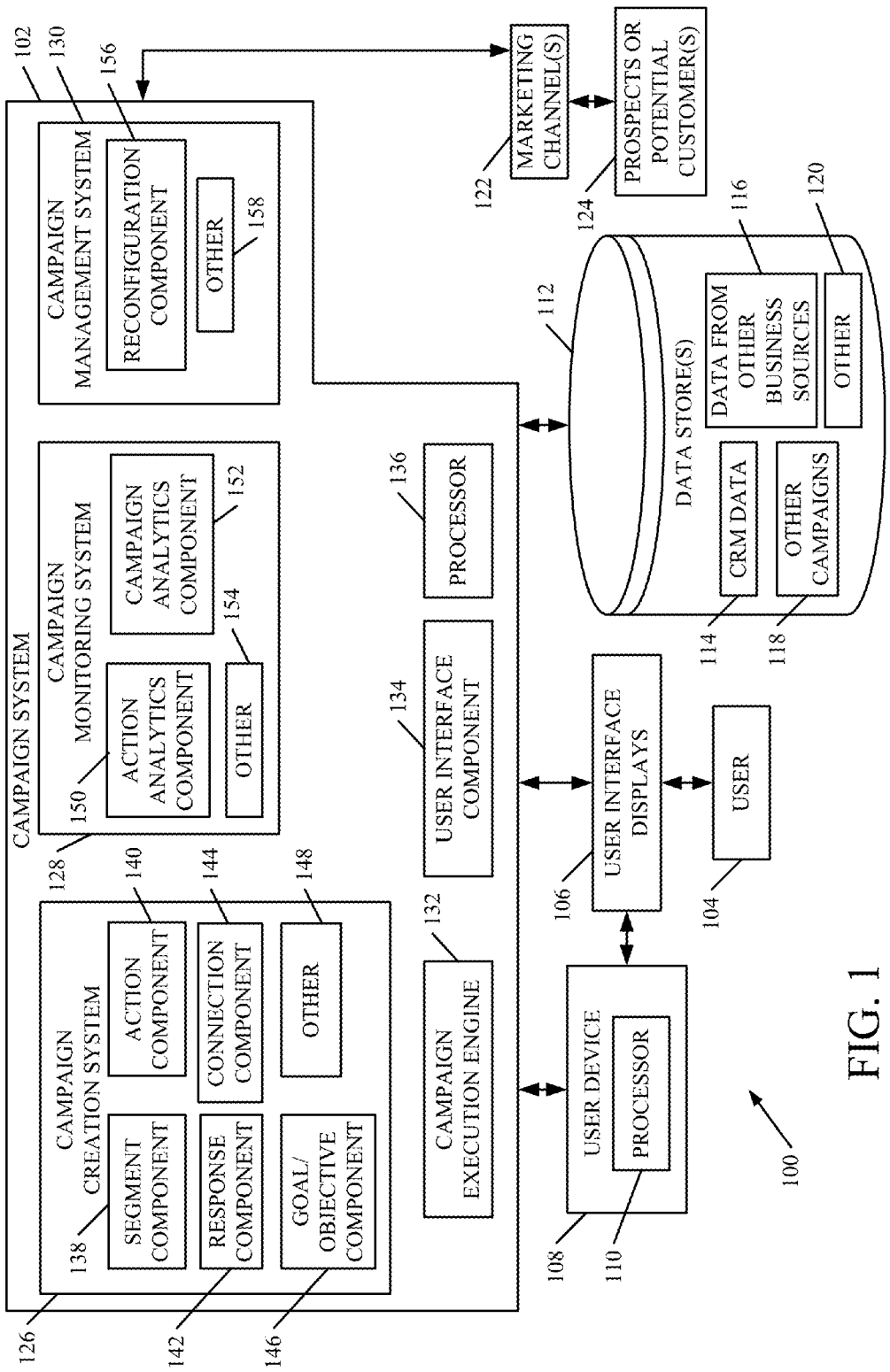
FIG. 1 is a block diagram of one embodiment of a campaign architecture.

FIG. 1 is a block diagram of one illustrative embodiment of a campaign architecture 100. Campaign architecture 100 includes campaign system 102 that can be accessed by user 104 through user interface displays 106. Displays 106 can be generated by a user device 108 (such as under the control of processor 110) or by campaign system 102, directly. User 104 illustratively interacts with user input mechanisms on user interface displays 106 in order to manipulate and control campaign system 102 to create a marketing campaign, to monitor the performance of the marketing campaign, and to manage the marketing campaign, while it is being executed.

FIG. 1 also shows that, in one embodiment, campaign system 102 illustratively has access to a variety of different types of data in one or more data stores 112. In the embodiment shown, data store 112 illustratively includes business data (such as data from a customer relations management system, an enterprise resource planning system, a line-of-business system, or another type of business system). Specifically, in the embodiment shown in FIG. 1, data store 112 illustratively has customer relations management (CRM) data, although this is exemplary only.

Data store 112 can also illustratively have business/marketing data from other sources 116 as well. In addition, data store 112 can store other marketing campaigns that have already been created, that are currently running, or that have previously been run, by user 104 or the organization for which user 104 works. The other campaigns are indicated by block 118 in FIG. 1. Data store 112 can have other data as well, as indicated by block 120.

Once user 104 generates or creates a marketing campaign using campaign system 102, the marketing campaign can be executed through one or more marketing channels 122, targeting one or more different prospects or potential customers 124. Prospects or potential customers 124 can illustratively take actions during the marketing campaign that can be captured and analyzed by campaign system 102.

Before describing the operation of system 102 in more detail, a brief discussion of some of the items in system 102 will first be provided. In the embodiment shown in FIG. 1, campaign system 102 illustratively includes campaign creation system 126, campaign monitoring system 128, campaign management system 130, campaign execution engine 132, user interface component 134 and processor 136. User 104 can illustratively access campaign creation system 126 in order to create a marketing campaign. System 126 thus illustratively includes segment component 138, which allows user 104 to identify a market segment to which the campaign will be addressed. It illustratively includes action component 140 that allows user 104 to configure the campaign to take various actions. Response component 142 allows user 104 to identify various responses and connection component 144 allows user 104 to automatically connect the actions input through action component 140 to other actions. Goal/objective component 146 allows user 104 to set goals or objectives for the marketing campaign, which can be measured. Campaign creation system 126 can include other items 148 as well.

Once the campaign is created using system 126, user 104 can monitor the performance of the campaign using campaign monitoring system 128. System 128 illustratively includes action analytics component 150. Component 150 includes analytics that aggregate information and other performance data relative to the individual actions taken in the marketing campaign. Analytics component 152 illustratively aggregates various performance data to generate performance measures or metrics indicative of the overall performance of the campaign, or certain sub-portions of the campaign. Campaign monitoring system 128 can include other items 154 as well.

While the campaign is being conducted, user 104 can manage the campaign, by making changes or otherwise, using campaign management system 130. Reconfiguration component 156 allows the user to reconfigure or modify the various actions or other items in the campaign, even while it is being run. Campaign management system 130 can include other items 158 as well.

Campaign execution engine 132 is illustratively configured to automatically run the campaign, after it is created by user 104. By automatically it is meant that the execution is done without the need for substantially any other user actions, other than perhaps receiving a user input to start or activate the execution. Thus, when user 104 has created, and activates, a marketing campaign, campaign execution engine 132 automatically takes actions defined by the created marketing campaign, to execute the marketing campaign directed to the selected marketing segment (set of prospects).

User interface component 134 either itself, or under the control of other items in system 102, illustratively generates user interface displays 106 with user input mechanisms that receive user inputs from user 104. The user interface displays 106 can also be generated by a user interface component in user device 108. In any case, user 104 interacts with the user input mechanisms in order to access systems 126, 128 and 130 to create, monitor, manage and modify a complex, multi-step marketing campaign.

Figure 2A:
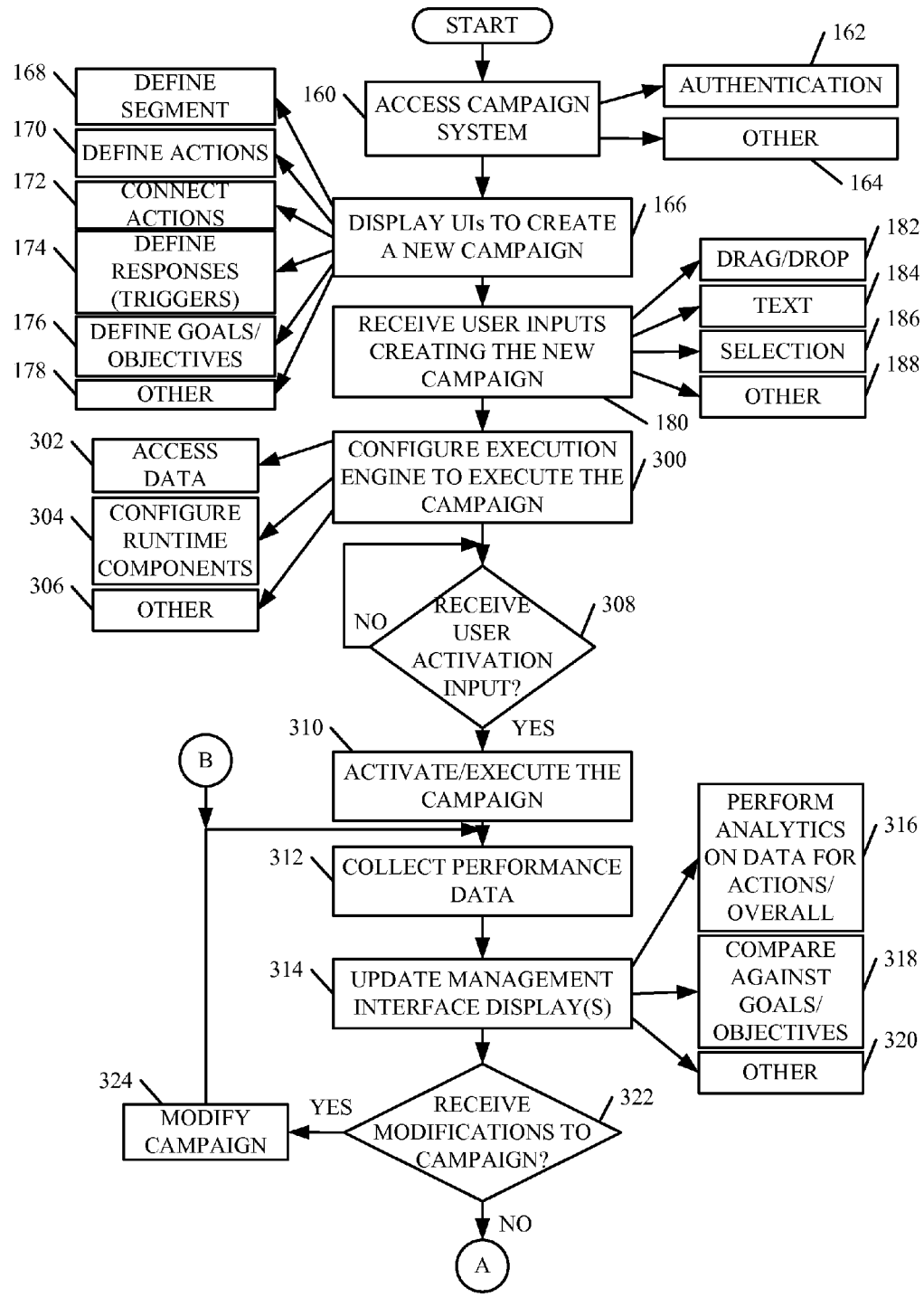
FIGS. 2A and 2B (collectively FIG. 2) show a flow diagram illustrating one embodiment of the overall operation of the campaign architecture shown in FIG. 1.
Figure 2B:
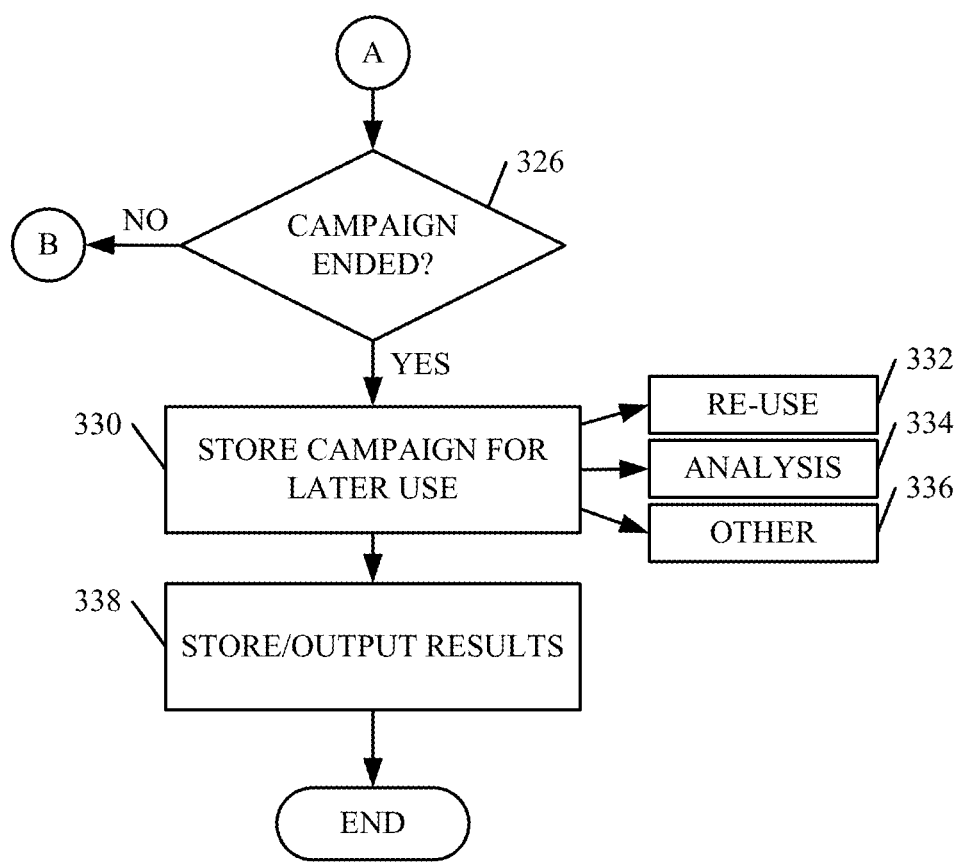
Figure 3A:
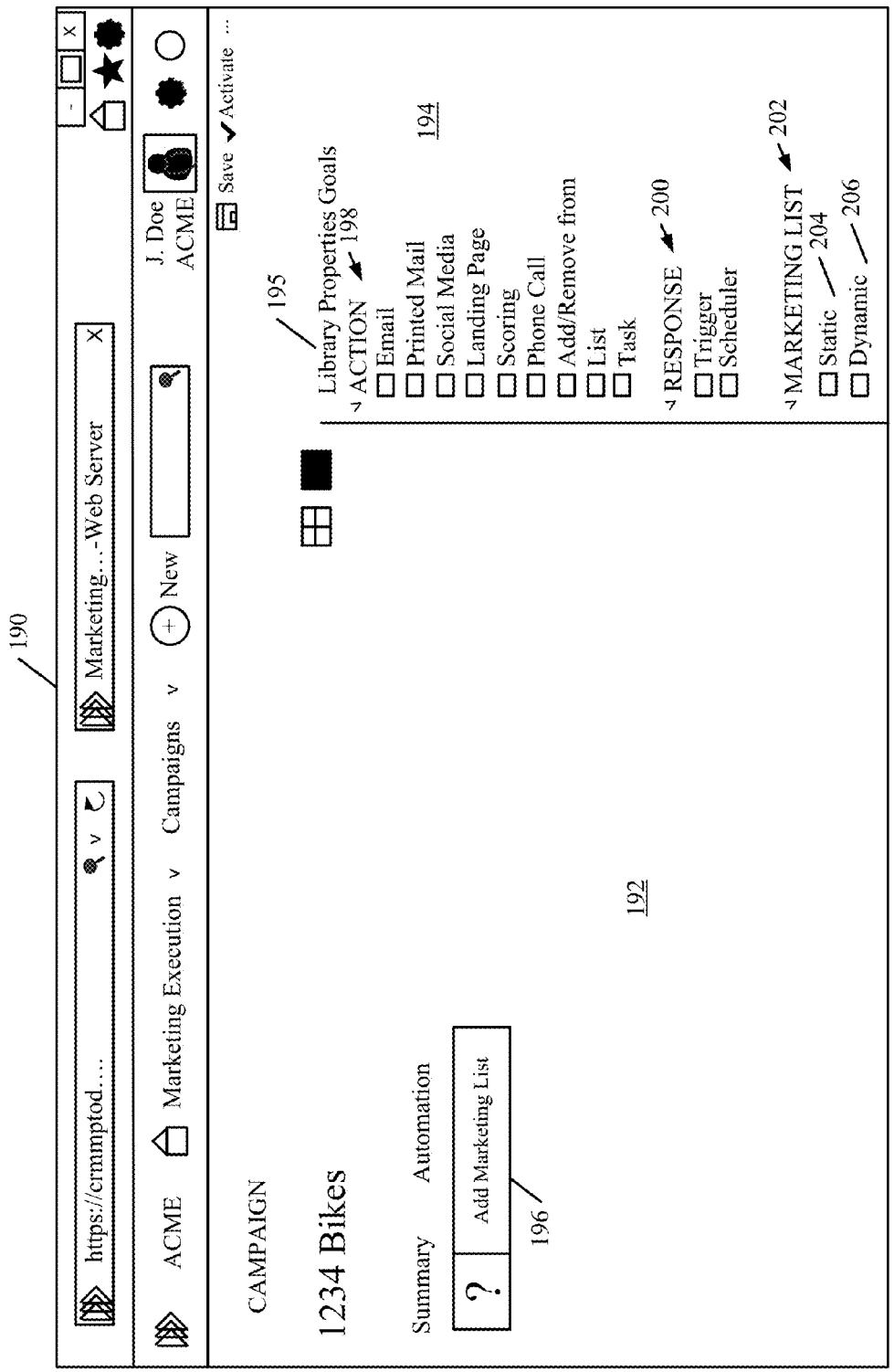
FIGS. 3A-3Q show exemplary user interface displays.
Figure 3B:
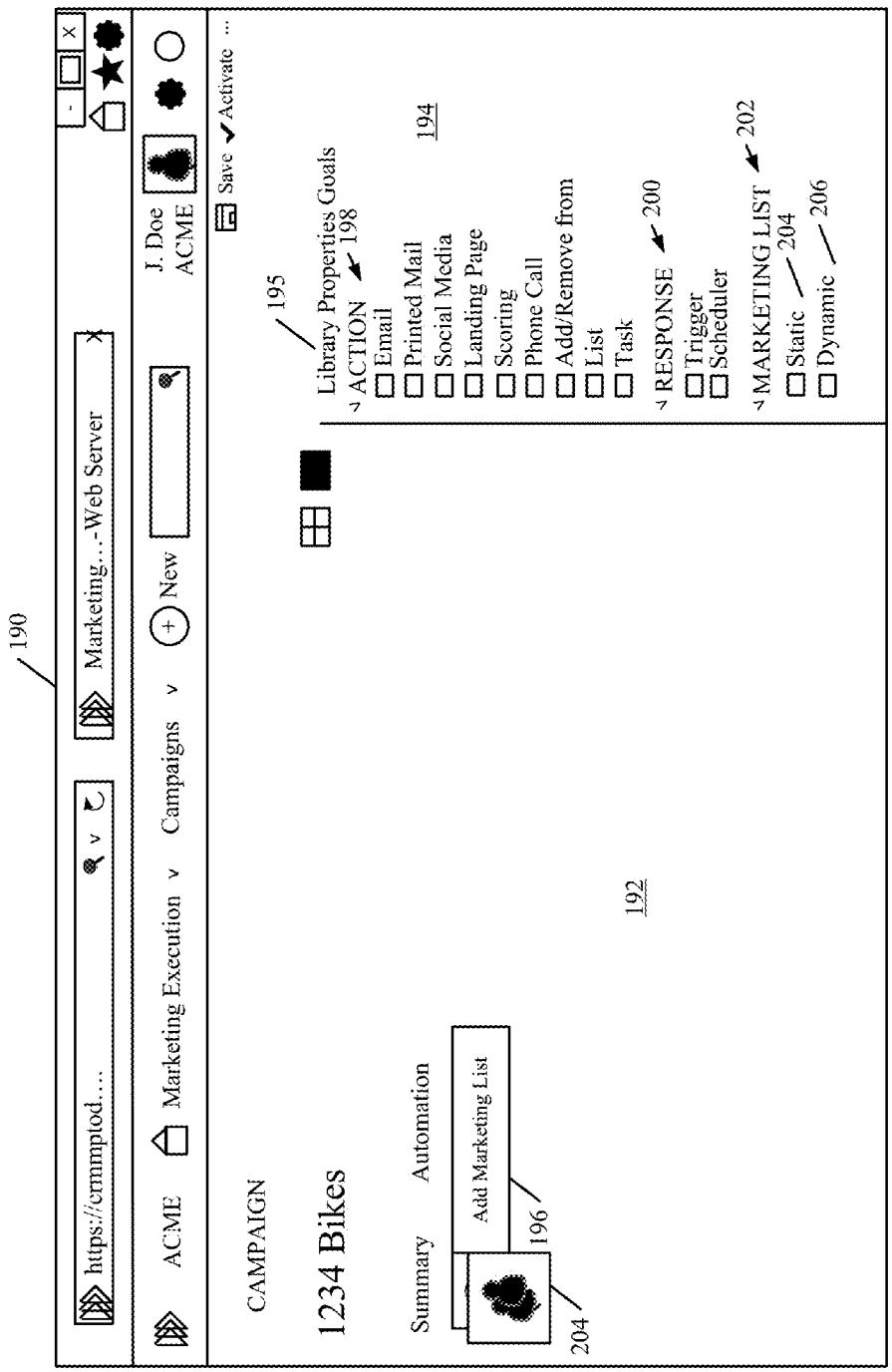
Figure 3C:
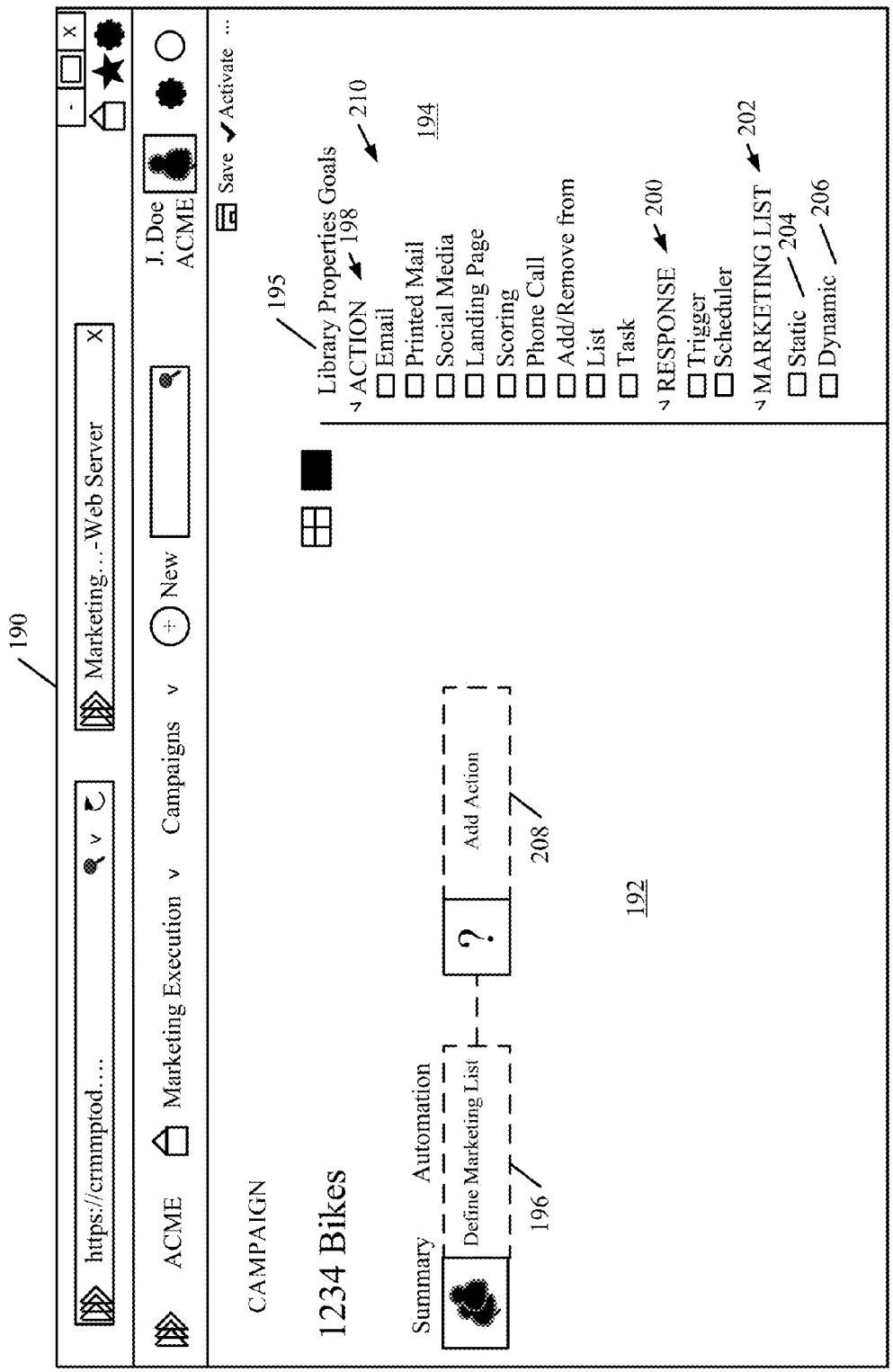
Figure 3D:
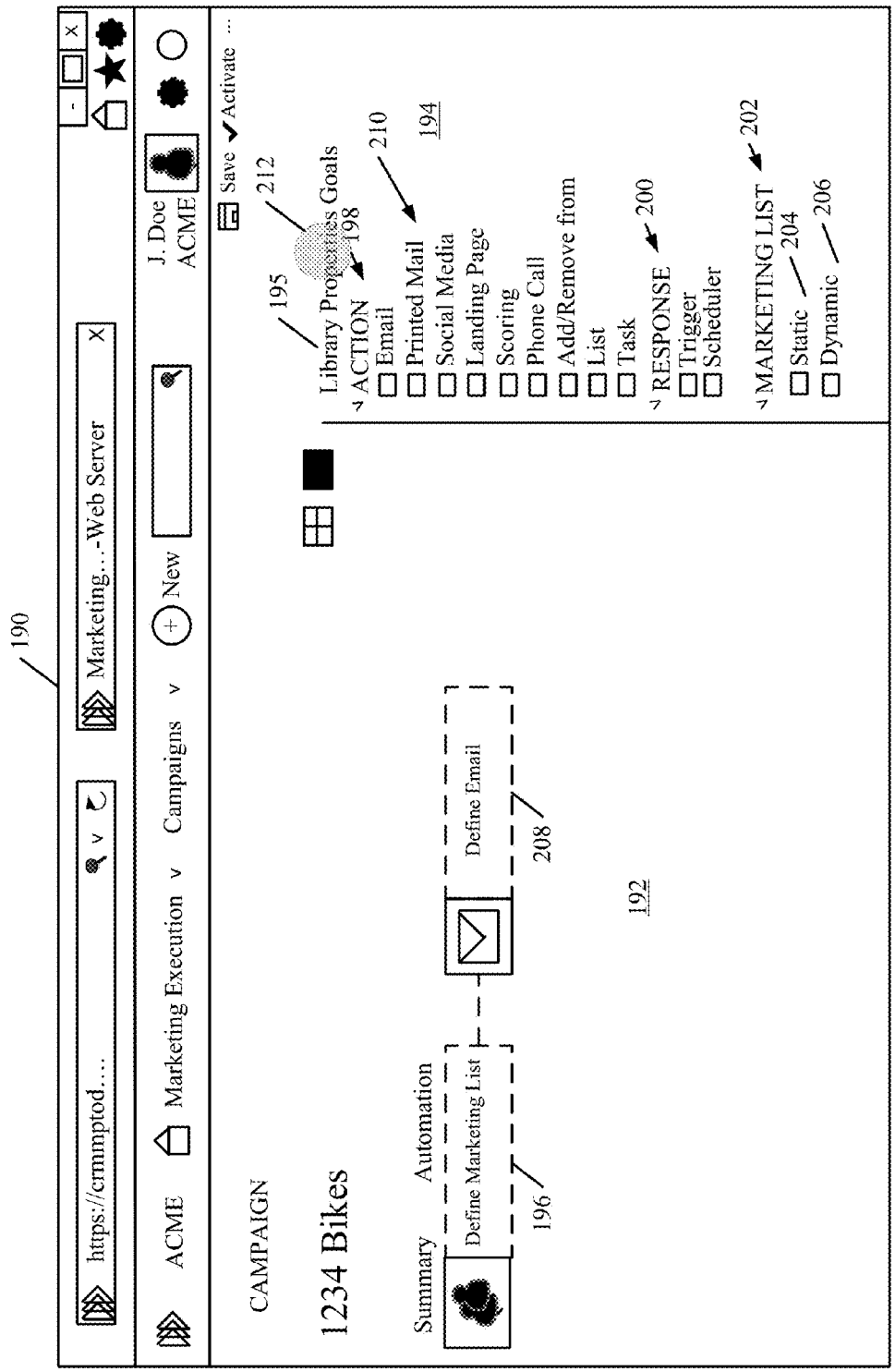
Figure 3E:
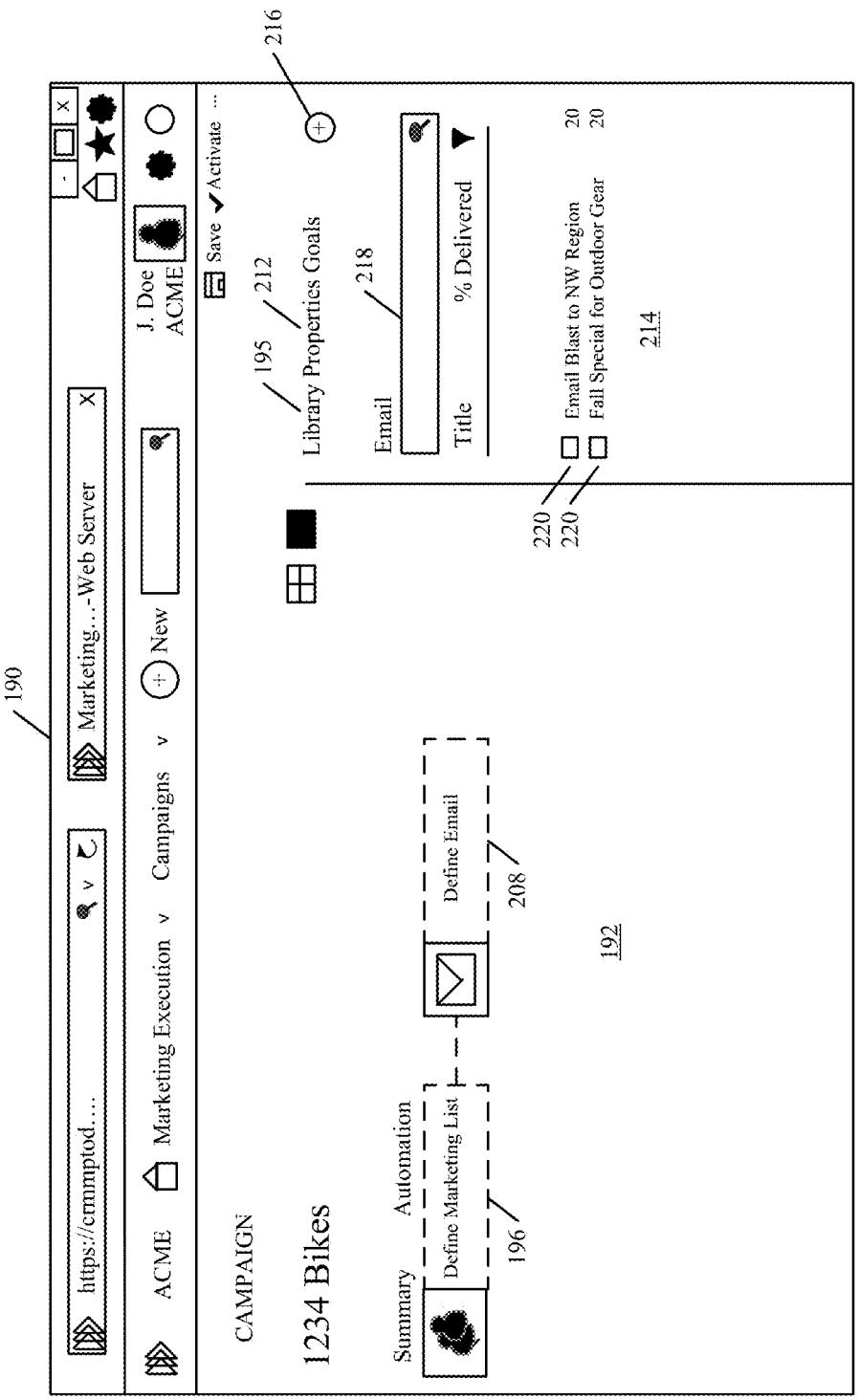
Figure 3F:
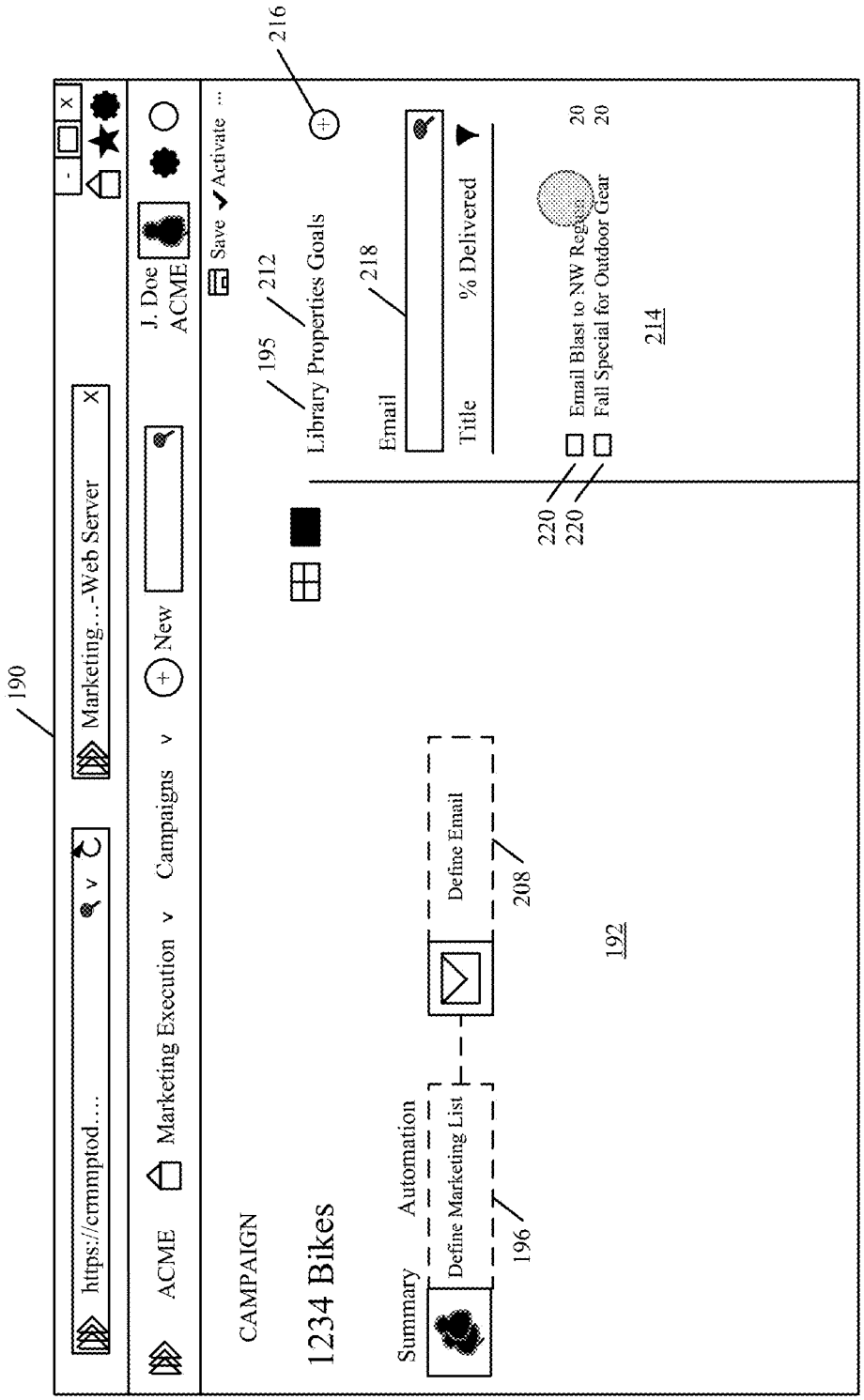
Figure 3G:
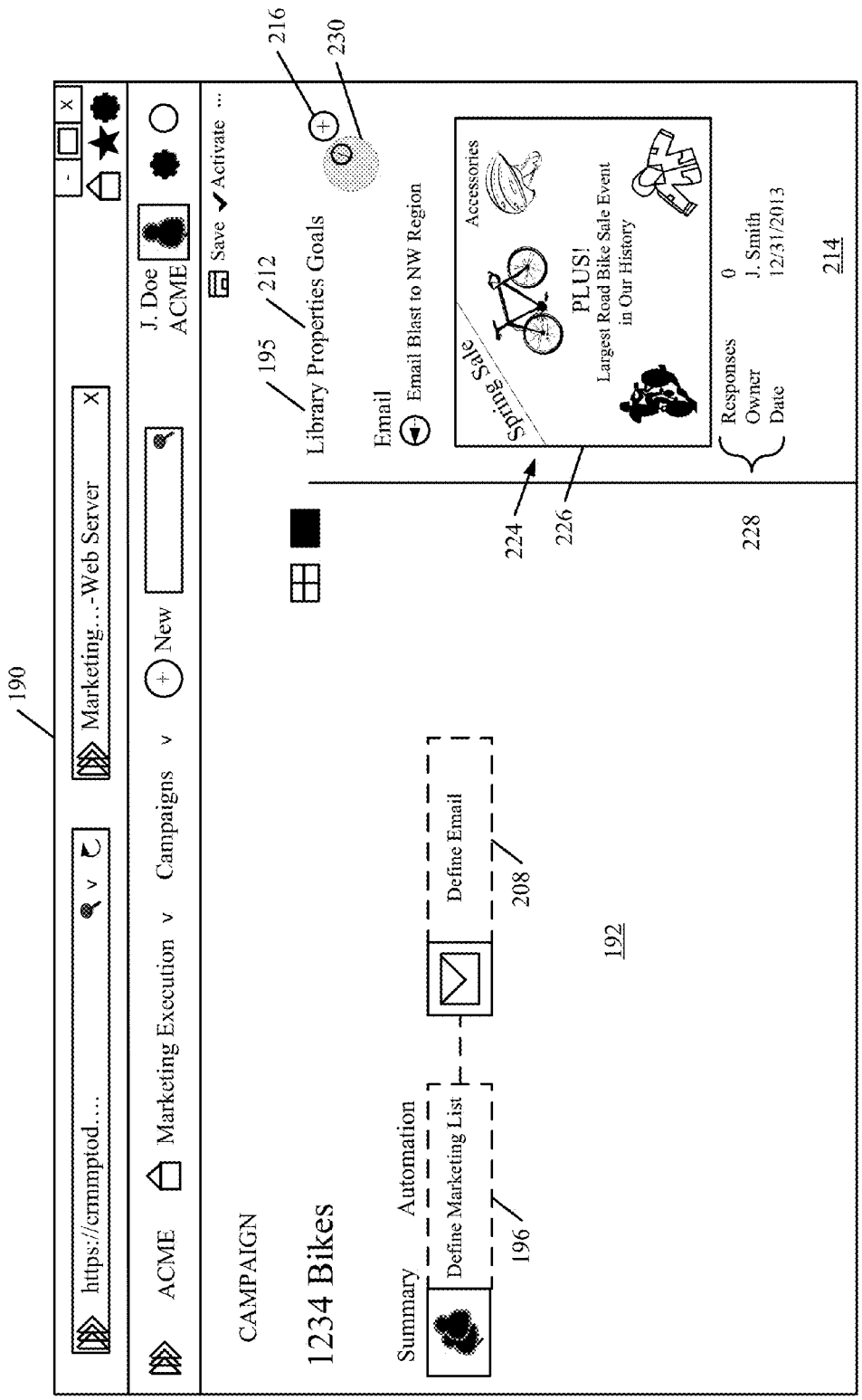
Figure 3H:
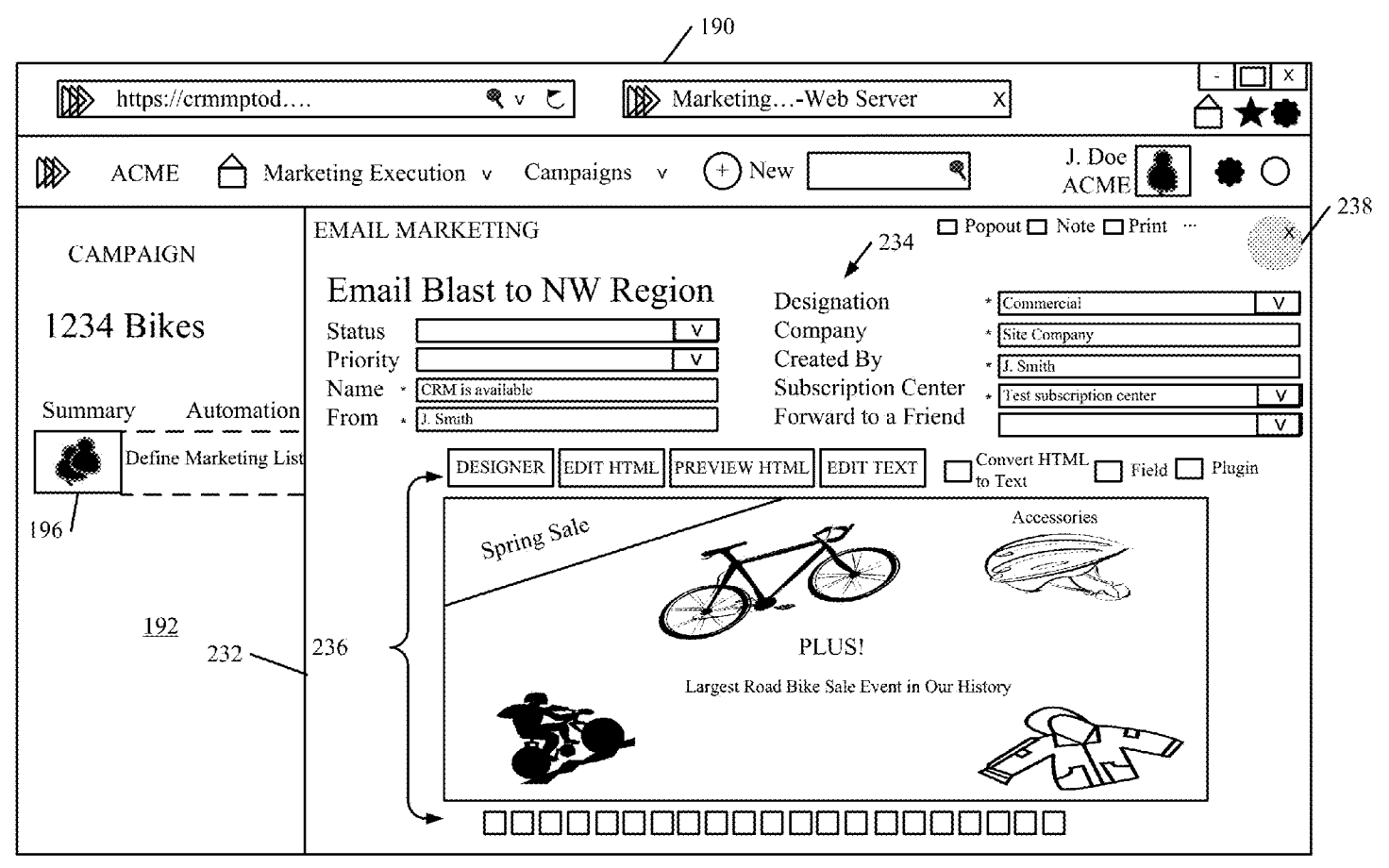
Figure 3I:
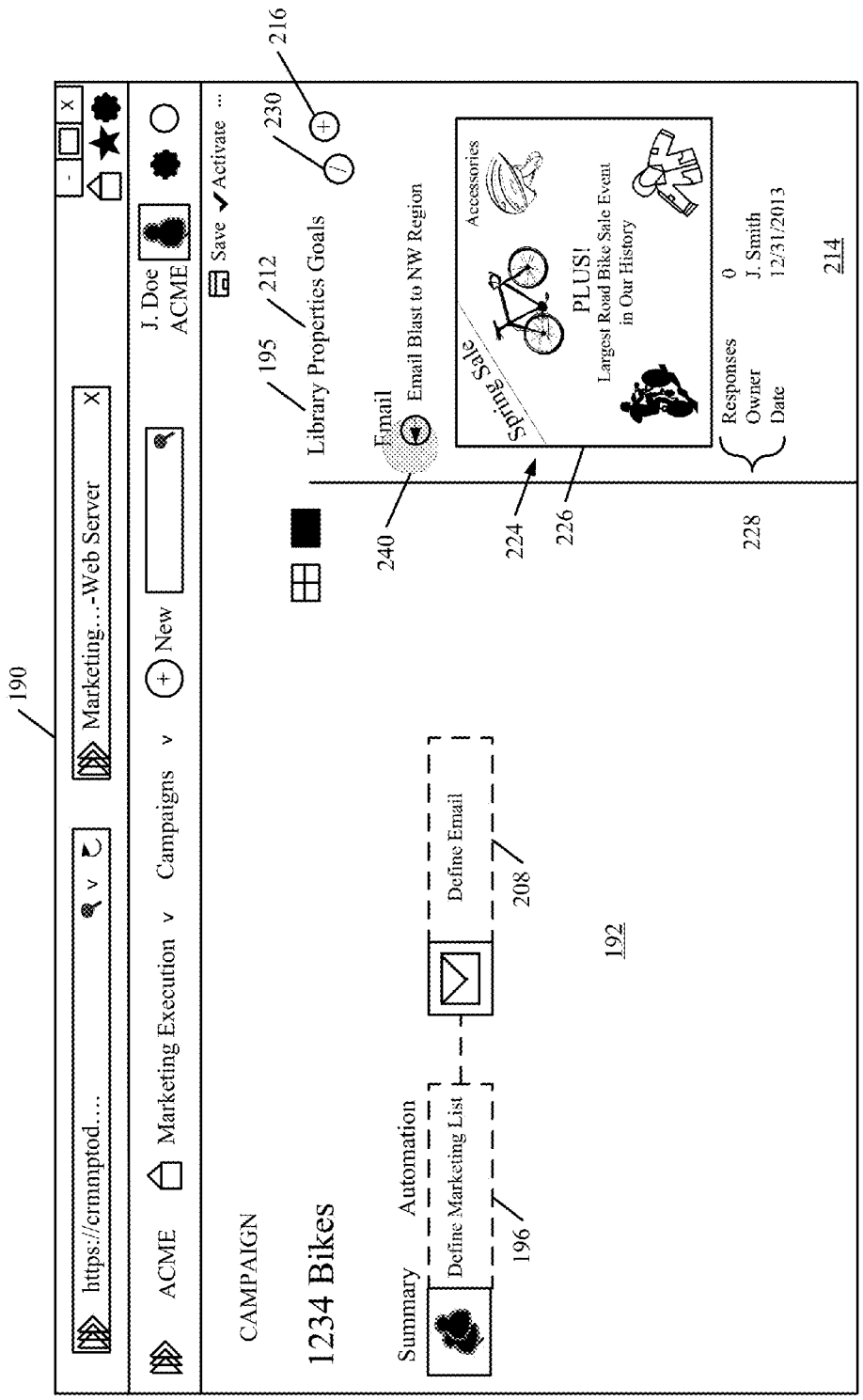
Figure 3J:
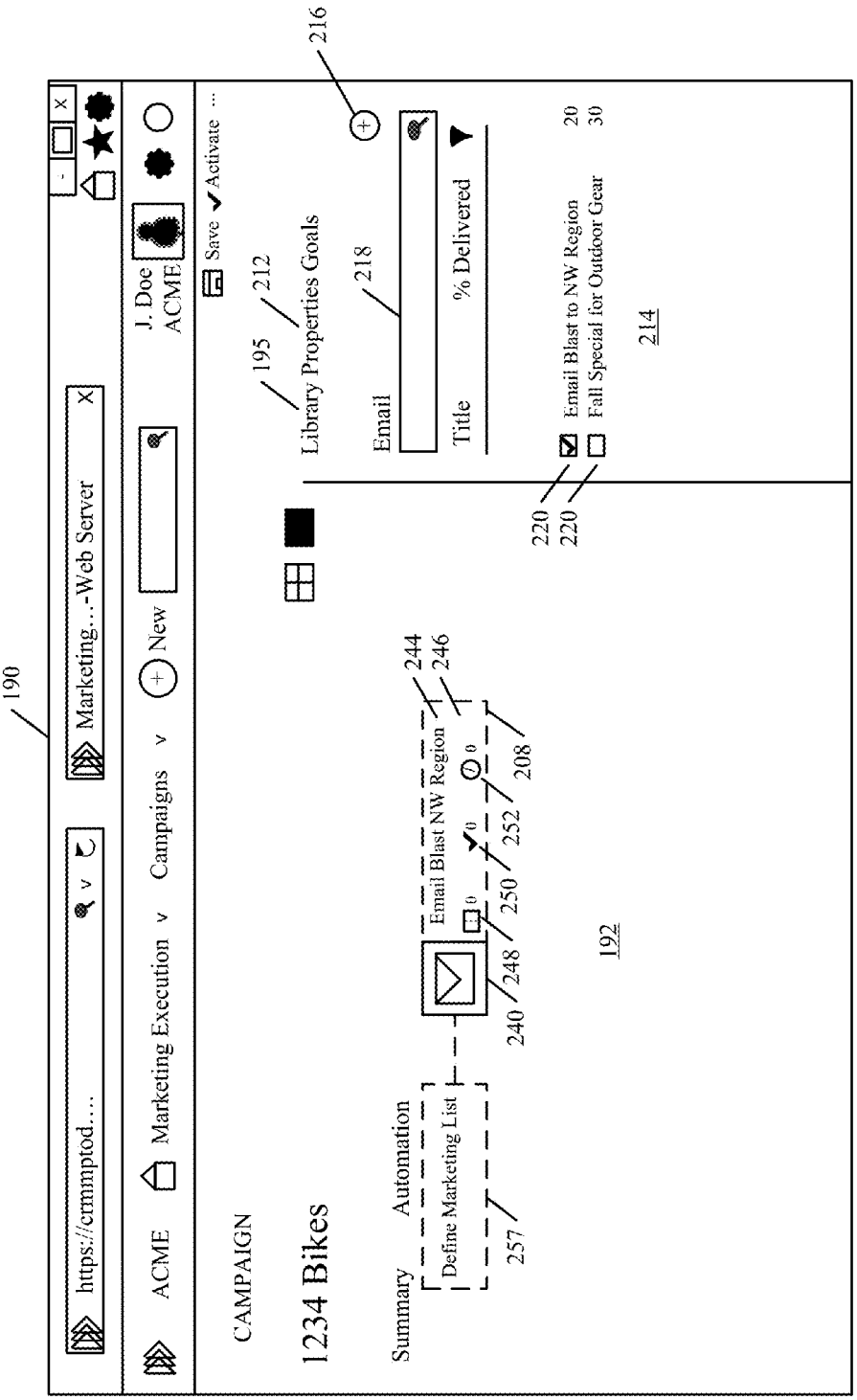
Figure 3K:
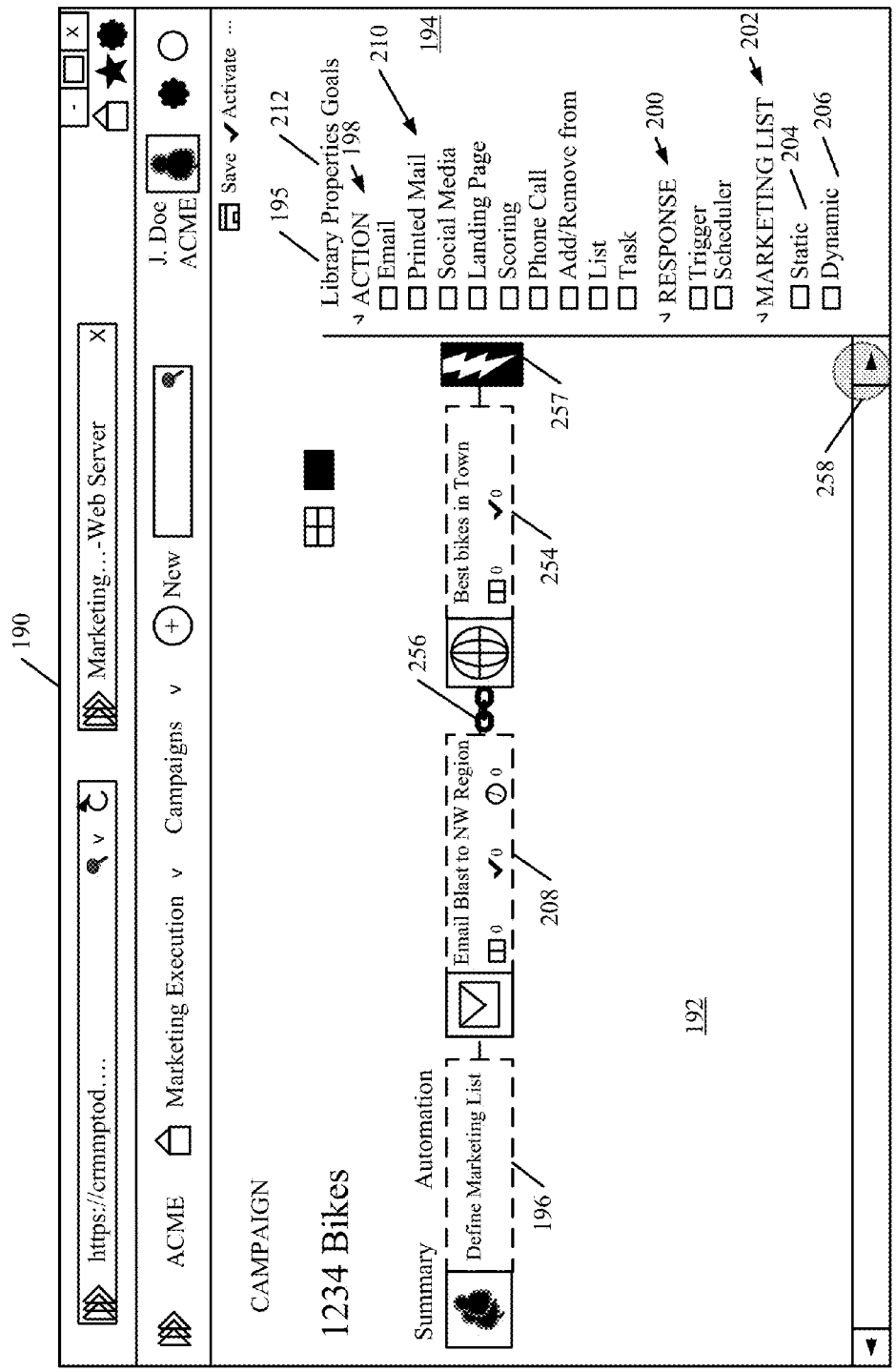
Figure 3L:
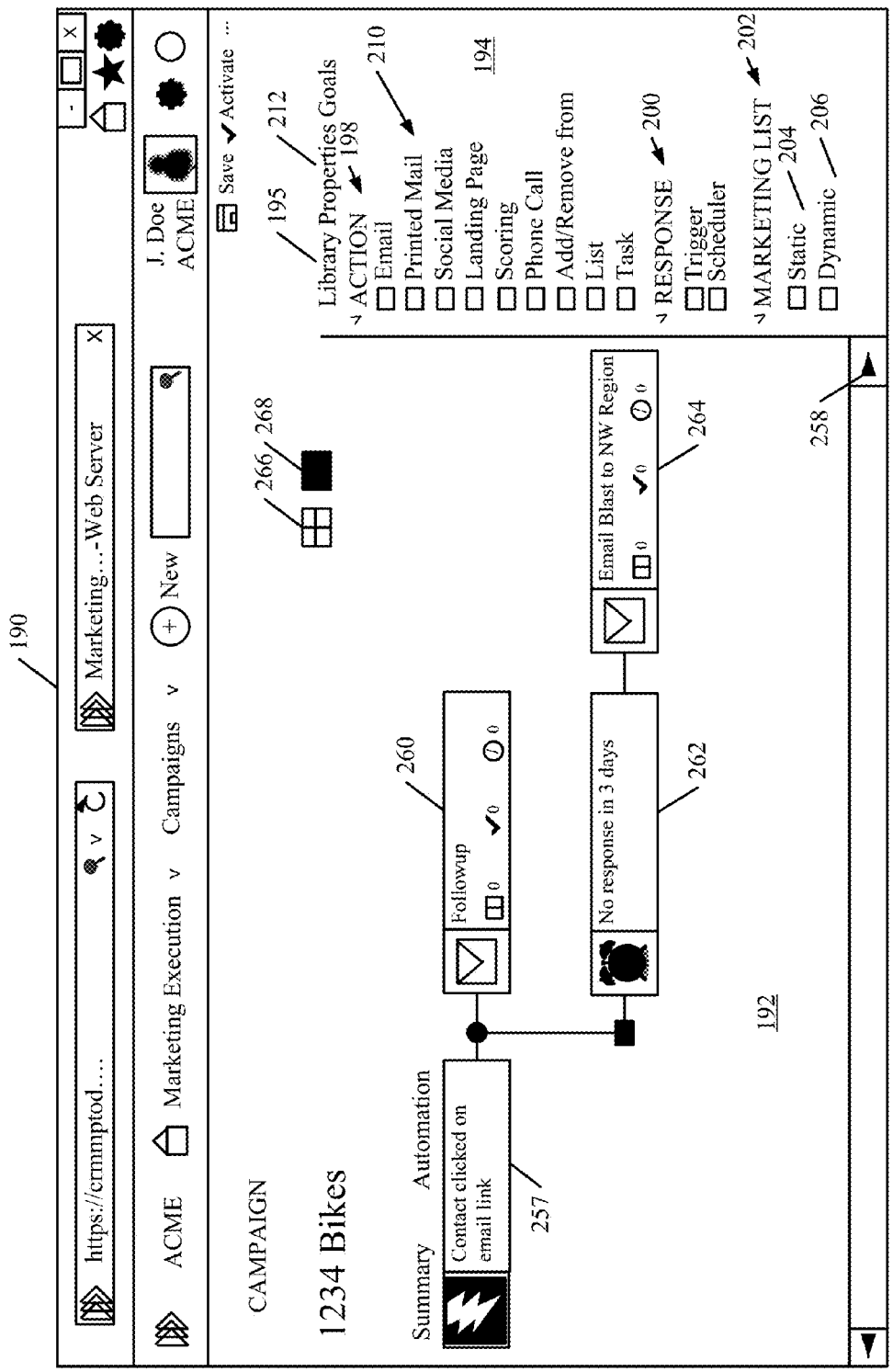
Figure 3M:
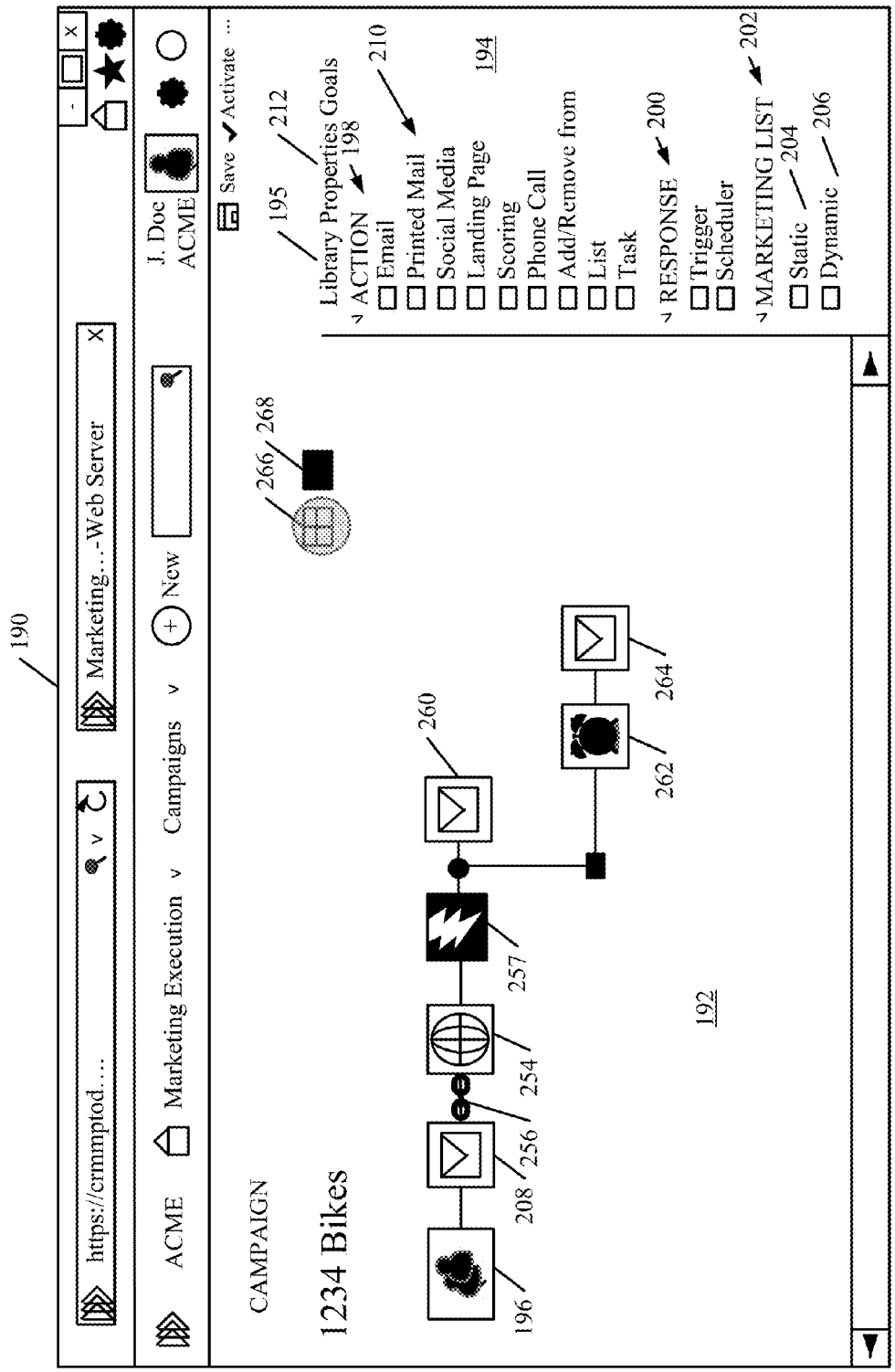

FIGS. 2A and 2B (collectively FIG. 2) illustrate a flow diagram that shows one embodiment of the overall operation of architecture 100, shown in FIG. 1, in more detail. FIGS. 3A-3Q are exemplary user interface displays generated during that process. FIGS. 1-3Q will now be described in conjunction with one another.

User 104 first provides inputs to access campaign system 102. This is indicated by block 160 in the flow diagram of FIG. 2. This can include authentication information 162 or a variety of other information 164.

Once user 104 has accessed campaign system 102, and indicated that he or she wishes to create a new campaign, campaign creation system 126 illustratively generates user interface displays to create a new campaign. This is indicated by block 166 in FIG. 2. This can include, for instance, defining one or more segments for the campaign as indicated by block 168, defining the actions to be taken in the campaign as indicated by block 170, connecting the actions to one another as indicated by block 172, defining or identifying the responses to those actions that can be taken by the user, as indicated by block 174, defining the goals and objectives of the marketing campaign as indicated by block 176, or other items as indicated by block 178. Campaign creation system 126 then receives user inputs creating the new campaign. This is indicated by block 180 in FIG. 2. The user inputs can take a wide variety of different forms, such as drag and drop inputs 182, text entry inputs 184, selection (such as click or double click or tap) inputs 186 or other inputs 188.

Figure 3N:
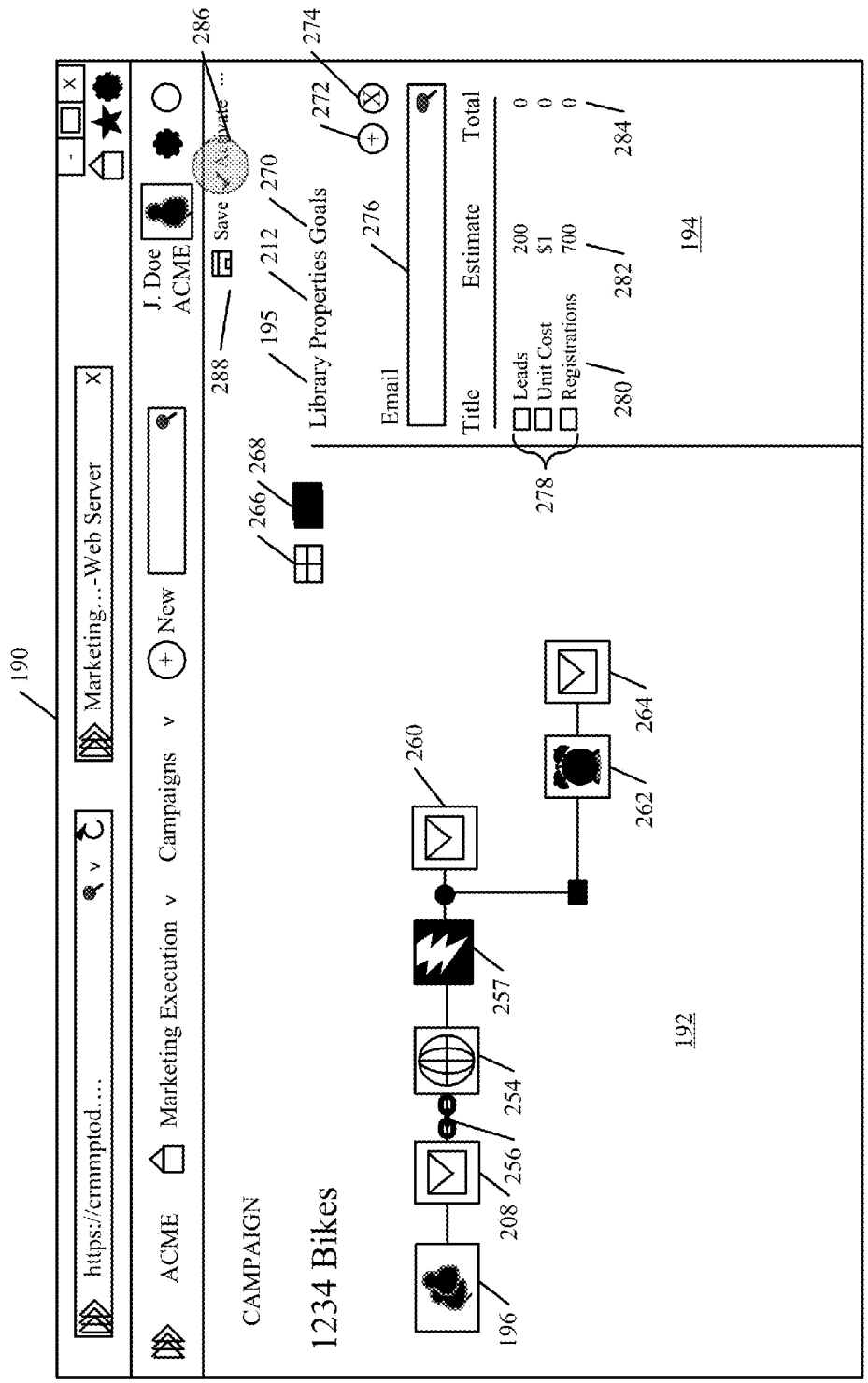
Figure 30:
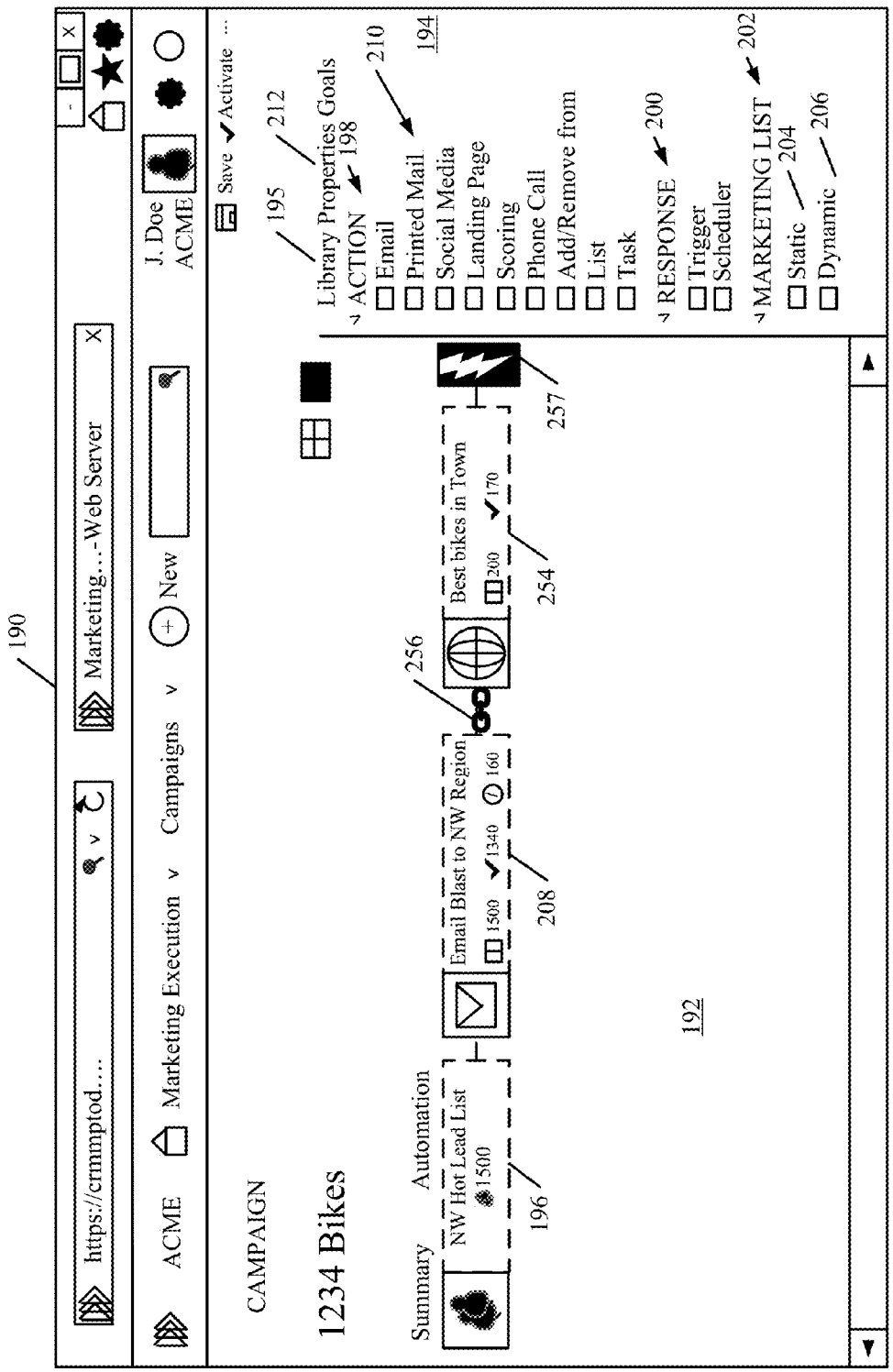

FIGS. 3A-3N show exemplary user interface displays indicating how campaign creation system 126 allows a user to easily create a marketing campaign. Therefore, before proceeding with a description of the remainder of FIG. 2, FIGS. 3A-3N will first be described. They are described by way of example only. A wide variety of other, additional or different user interface displays could be used as well.

FIG. 3A shows one example of a user interface display 190. User interface display 190 allows user 104 to identify the particular segment (e.g., the marketing list) that will identify the audience for the marketing campaign. In one embodiment, user interface display 190 includes an automation flow pane 192 and an elements pane 194. Automation flow pane 192 shows the flow of actions in the marketing campaign, and elements pane 194 includes the various elements (such as actions, responses and segments for marketing lists) that can be used in the marketing campaign. It can be seen that the user has actuated a library user input mechanism 195 on pane 194. Thus, pane 194 shows a library of items (or elements) that can be added to the marketing campaign shown in pane 192. Pane 194 includes an actions section 198, a responses section 200 and a marketing list section 202. Actions section 198 includes actions which can be taken during the marketing campaign, and it is described in greater detail below. Response section 200 includes a set of responses such as a trigger and a scheduler, and they are described in greater detail below as well. Marketing list section 202 allows the user to select a marketing list that identifies an audience for the marketing campaign.

FIG. 3A shows that, in one embodiment, segment component 138 (from FIG. 1) prompts the user with a display element 196 that allows the user to select a marketing segment, or marketing list, to identify the target audience of the marketing campaign. The user can select a static list by actuating display element 204, or a dynamic list by actuating element 206. A static list illustratively contains a list of contacts, leads or accounts that the user can add to or delete from. A dynamic list is illustratively based on a query expression so the members of the list are dynamically selected, as desired. Thus, unlike a static list, a dynamic list is created based upon queries that are set up, and that will identify the members of the list and generate the list at runtime.

The user can actuate elements 204 and 206 in a wide variety of ways, such as by selecting display element 196 on pane 102 and double clicking on one of elements 204 or 206. Additionally, in one embodiment, the user can drag and drop one of elements 204 and 206 from pane 194 onto display element 196 in pane 192.

In one embodiment, each of the discrete static or dynamic lists are listed in section 202. In another embodiment, when the user selects static list element 204, the user is navigated through a user experience that allows the user to select a static list (such as from a drop down menu or otherwise). When the user actuates element 206, the user is navigated through a user experience that allows the user to define or select a dynamic list FIG. 3B shows user interface display 190, as user 104 is selecting a static marketing list. It can be seen in FIG. 3B, that the user has dragged and dropped element 204 from section 202 in pane 194 onto display element 196 in pane 192.

Once user 104 has selected the segment (or marketing list), action component 140 in campaign generation system 126 prompts the user to add an action to the marketing campaign by displaying display element 208. In one embodiment, the various actions that can be added by user 104 are listed in action section 198 of pane 194.

Each of the actions in section 198 is illustratively identified by a display element. The actions are collectively referred to by number 210 in FIG. 3C. In the example illustrated, they include an e-mail action with sends an e-mail, a printed mail action which prints and sends mail, a social network action which performs an action on a social network, a landing page action which identifies a landing page that a consumer will be navigated to when a given action is taken (such as a landing page that the user will be navigated to when he or she responds to an e-mail or clicks a link in an email), a scoring action that generates a score for a given prospect, a phone call action that prompts a telephone call to a given prospect, an add/remove from list action that results in a prospect being added to, or removed from, the selected marketing list, a task action that includes one or more tasks, and it can include other actions as well. User 104 can add an action to the marketing flow in pane 192 by selecting display element 208 and double clicking on one of the actions 210 in action section 198 of pane 194, or by dragging one of the actions display elements from the actions section 198 onto display element 208 in pane 192 and dropping it there, or in other ways.

FIG. 3D shows that the user has added an e-mail action 210 to the flow shown in pane 192. For instance, in one embodiment, the user dragged the e-mail action display element 210 from pane 194 onto the display element 208 in pane 192.

Once the user has indicated that an e-mail is to be sent (as shown in FIG. 3D), the user 104 can further define the specific details regarding the type of e-mail that is to be sent in a number of different ways. For instance, in one embodiment, the user can double click on display element 208 on pane 192. In another embodiment, the user can select display element 208 in pane 192 and click on (or otherwise actuate) a properties user input mechanism 212 on pane 194.

In either case, the user is illustratively navigated to a user experience that allows the user to define, in more detail, the particular properties or characteristics of the email that is to be sent during the marketing campaign and that is represented by display element 208 in pane 192. FIGS. 3E-3J are exemplary user interface displays that indicate this.

In one embodiment, once the user has requested to view and configure the properties of the e-mail action, action component 140 in campaign creation system 126 no longer displays pane 194. Instead, it displays details pane 214 shown in FIG. 3E. Details pane 214 illustratively includes an add user input mechanism 216 that allows the user to add a new e-mail, which has not previously been defined. A search user input mechanism 218 illustratively allows the user to search for other e-mails that have been previously defined. Pane 214 also illustratively includes selection user input mechanisms 220 and 222 that allow the user to simply select other, previously defined, e-mails that have already been sent either in accordance with other marketing campaigns, or that have been previously defined for the present marketing campaign.

FIG. 3F shows that the user is selecting (or actuating) user input mechanism 220, corresponding to a preexisting e-mail that has already been configured and that is entitled "e-mail blast to NW region". In one embodiment, when the user does this, pane 214 displays an overview of the corresponding e-mail. This is indicated, for example, in the user interface display of FIG. 3G.

FIG. 3G shows that pane 214 now illustratively includes an overview section 214 corresponding to the selected e-mail. The overview can, in one embodiment, not only illustratively shows a visual representation 226 of the e-mail, but it also illustratively includes related data section 228, such as the number of responses previously generated for the e-mail, the owner of the e-mail (such as the author) and the date that it was authored. These are exemplary only and other items can be shown as well.

FIG. 3G shows that pane 214 also illustratively includes an edit user input mechanism 230. When the user actuates mechanism 230, the user is illustratively navigated to a user experience where the user can edit the e-mail that is shown in overview section 224. FIG. 3H is a user interface display showing one embodiment of this.

In FIG. 3H, a popup section 232 is generated, and allows user 104 to edit the e-mail for "e-mail blast to NW region", previously selected by user 104. Popup display 232 illustratively includes a first set of user input mechanisms generally indicated at 234 that allow the user to change the status, priority, name, "from" field, designation (such as commercial, personal, etc.), company, "created by" field, subscription center, and forwarding information. These are exemplary only and a wide variety of different or additional items could be included in user input mechanisms 234 as well. Further, display 232 illustratively includes a set of editing user input mechanisms generally indicated by number 236. They illustratively allow the user to edit the content of the e-mail. Those shown are shown for example only and a wide variety of additional or different user input mechanisms 236 could be used as well.

Once the user has edited the e-mail as desired, the user can illustratively actuate the exit user input mechanism 238 to return to the user interface display, such as that shown in FIG. 3I. FIG. 3I shows that the user can then actuate a user input mechanism, such as mechanism 240, to indicate that the user has finished defining the e-mail, and that the e-mail should now be placed in the marketing flow in pane 192. In another embodiment, where the user does not need to edit the e-mail, the user simply selects the e-mail from the list shown FIG. 3F, such as by checking the corresponding check box. FIG. 3J shows one embodiment where the user has done just this.

FIG. 3J also shows that once the user has selected the email, display element 208 is updated to show the specific details of the selected e-mail. For instance, in FIG. 3J, element 208 now includes an icon or other display element 242 indicating that the action is an e-mail. It illustratively includes title section 244 that shows the title of the e-mail, and performance metric section 246 that includes a plurality of different performance metrics indicating what types of responses the potential prospects or customers that receive the e-mail have taken. In one embodiment, for instance, the metrics include a navigation metric 248 that shows that the user has navigated to another site, from within the e-mail. Read metric 250 indicates that a user has read the e-mail and delete metric 252 indicates that the user deleted the e-mail, either prior to or after reading it. These metrics are indicative of exemplary performance data, and others can be used as well.

In one embodiment, the user continues in this way, adding actions, triggers (or responses) or other items from pane 194, until the marketing campaign is fully created. FIGS. 3K and 3L show one embodiment of a fully created marketing campaign. FIG. 3K shows not only display elements 196 and 208, but it indicates that the marketing campaign also includes a landing page action indicated by display element 254. Element 254 is coupled to element 208 by a connection indicator 256 that identifies a particular type of connection. For instance, in the embodiment shown in FIG. 3K, connection indicator 256 indicates that, when the recipient of the email opens the e-mail corresponding to display element 208 (or clicks on a link in the email), the recipient (e.g., potential customer or prospect) is navigated to a landing page corresponding to element 254. FIG. 3K also indicates that a response or trigger 257 has been added to the marketing campaign shown in pane 192.

If the user scrolls to the right in pane 192, such as by actuating arrow 258, the remainder of the marketing campaign flow is shown. FIG. 3L shows one embodiment of this. FIG. 3L shows that the display element 257, indicative of the trigger, identifies that when the contact (or prospect) has clicked on the e-mail link that was sent, this triggers the following action. FIG. 3L shows that the marketing campaign also includes an e-mail follow up action indicated by display element 260, a scheduling response indicated by display element 262, and a repeat e-mail message indicated by display element 264. The schedule response which sets an amount of time before the next action is performed (or schedules the following action, such as a meeting, a call, or another item). Each of the actions represented by the display elements on pane 192 (in both FIGS. 3K and 3L) are illustratively further defined by the user by either double clicking on the corresponding display element in pane 192, or by selecting it and actuating the "properties" user input mechanism 212 in pane 194. Regardless of how they are defined, user 104 has illustratively defined the details of each of the actions, as they are ordered and connected to one another in the marketing campaign flow in pane 192. FIGS. 3K and 3L also show that certain actions are to have performance data collected for them. Those actions include display elements that display the various metrics that are collected or calculated. In one embodiment, there are a plurality of different views of the overall marketing campaign flow that can be shown in pane 192. By way of example, a view selector user input mechanism illustratively includes a plurality of different selection elements, such as elements 266 and 268 shown in FIG. 3L. It can be seen that the user has already actuated mechanism 268, thus the more detailed view of the marketing campaign flow is shown in pane 192. However, if the user actuates element 266, a summary view, or abbreviated view, can be displayed. FIG. 3M shows one embodiment of this.

It can be seen in FIG. 3M that the display elements in pane 192 are now shown in summary form. By way of example, a visual indicator in each of the elements corresponds to the type of action it represents. However, the various metrics that are collected and calculated for each of the actions are not displayed. Thus, user 104 can see the overall marketing campaign flow in a single view, without having to scroll. The views shown in FIGS. 3K-3M are exemplary only, and other views can be used as well.

After the marketing campaign is fully defined, the user can then define the various goals or objectives for the marketing campaign. In one embodiment, the user does this by actuating the goals user input mechanism 270 shown in FIG. 3N. In response, the goal/objective component 146 (shown in FIG. 1) illustratively provides the user with a user experience that allows the user to set various goals or objectives. For instance, the user can add new goals or objectives by actuating user input mechanism 272. The user can delete goals or objectives by actuating mechanism 274. The user can search for previously defined goals or objectives using search input mechanism 276. The user can also select pre-defined goals or objectives by selecting corresponding user input mechanisms 278. Each of the goals or objectives illustratively includes a title or descriptive portion 280, an estimate of a metric corresponding to the goal or objective in section 282, and an actual measured (or collected) value in section 284. Thus, the actual performance of the overall goals or objectives of the marketing campaign can be measured against estimates.

Returning again to the operation of the overall system, and with reference to the flow diagram of FIG. 2, the user can then configure the execution engine 132 to automatically execute the marketing campaign. This is indicated by block 300. For instance, engine 132 can access the data in data store 112, as indicated by block 302. Engine 132 can configure the various runtime components (such as the e-mail system, other messaging systems, the analytics components 150 in campaign monitoring system 128, or other components) as indicated by block 304. Engine 132 can take other steps as well, as indicated by block 306.

Campaign execution engine 132 then waits for the user to activate the marketing campaign that the user has just created. This is indicated by block 308. When the user provides the activation input to activate or execute the marketing campaign, campaign execution engine 132 automatically executes the marketing campaign that the user has created. This is indicated by block 310.

By way of example, and referring to FIG. 3N, the user can activate the marketing campaign by actuating user input mechanism 286. The user can also save the marketing campaign by actuating user input mechanism 288. However, when the user activates the marketing campaign, campaign execution engine 132 automatically executes the marketing campaign, as defined in the flow displayed in pane 192.

During execution of the marketing campaign, campaign monitoring system 128 illustratively collects performance data from the various actions and other items in the defined marketing campaign. This is indicated by block 312 in the flow diagram of FIG. 2. For instance, action analytics component 150 collects and calculates the various metrics corresponding to each of the actions in the marketing campaign. Campaign analytics component 152 collects and calculates the various metrics indicative of the performance of the overall marketing campaign. Campaign monitoring system 128 then updates the user interface displays for the marketing campaign to reflect the collected and calculated metrics. Updating the interface display is indicated by block 314 in FIG. 2. Performing analytics on each of the individual actions and for the overall campaign is indicated by block 316. Those analytics can be aggregated and compared against the goals or objectives for the marketing campaign and that display can be updated as well. This is indicated by block 318. Other metrics and calculations can be performed and the displays can be updated in other ways as well, as indicated by block 320.

Figure 3P:
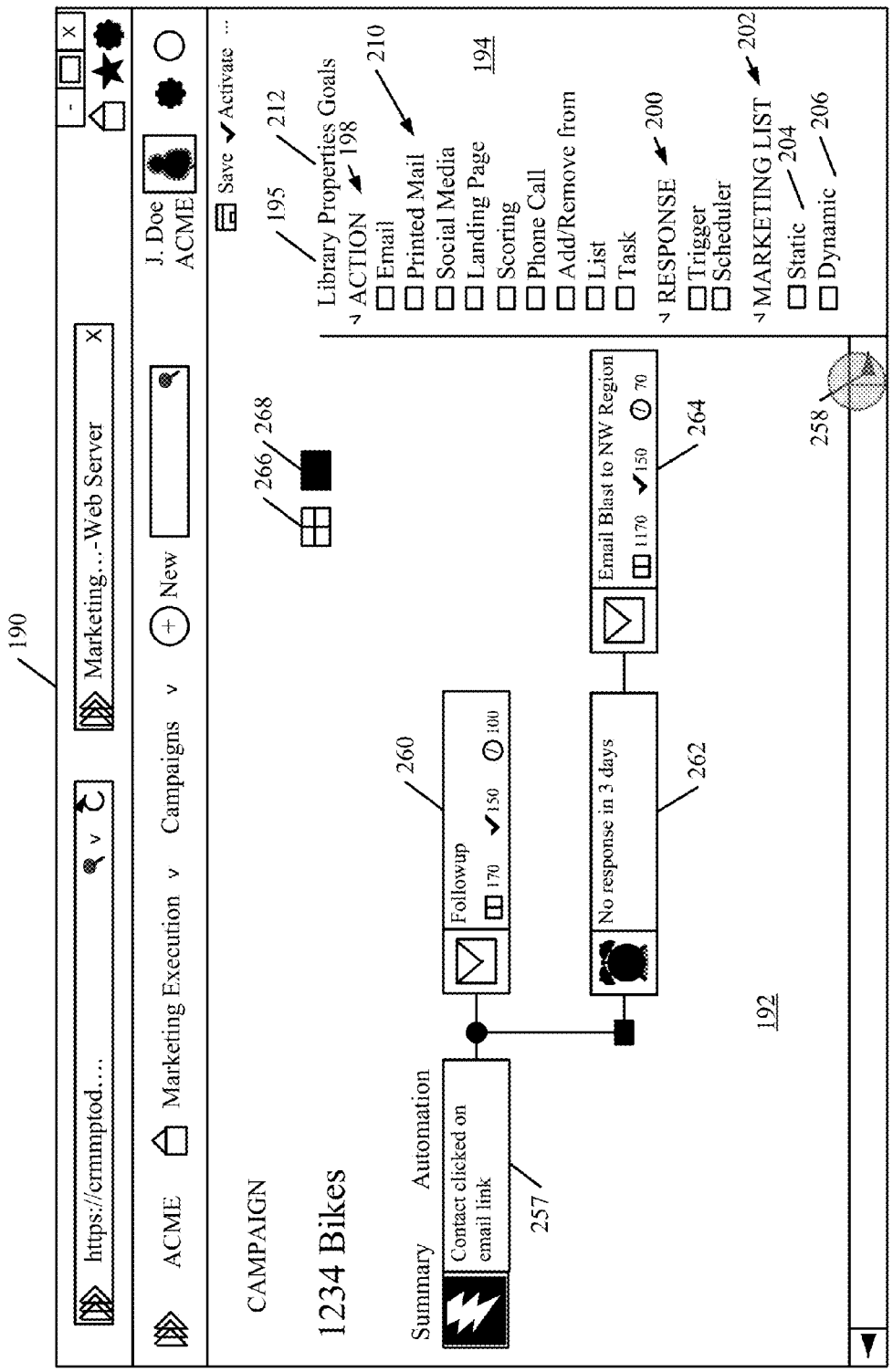
Figure 3Q:
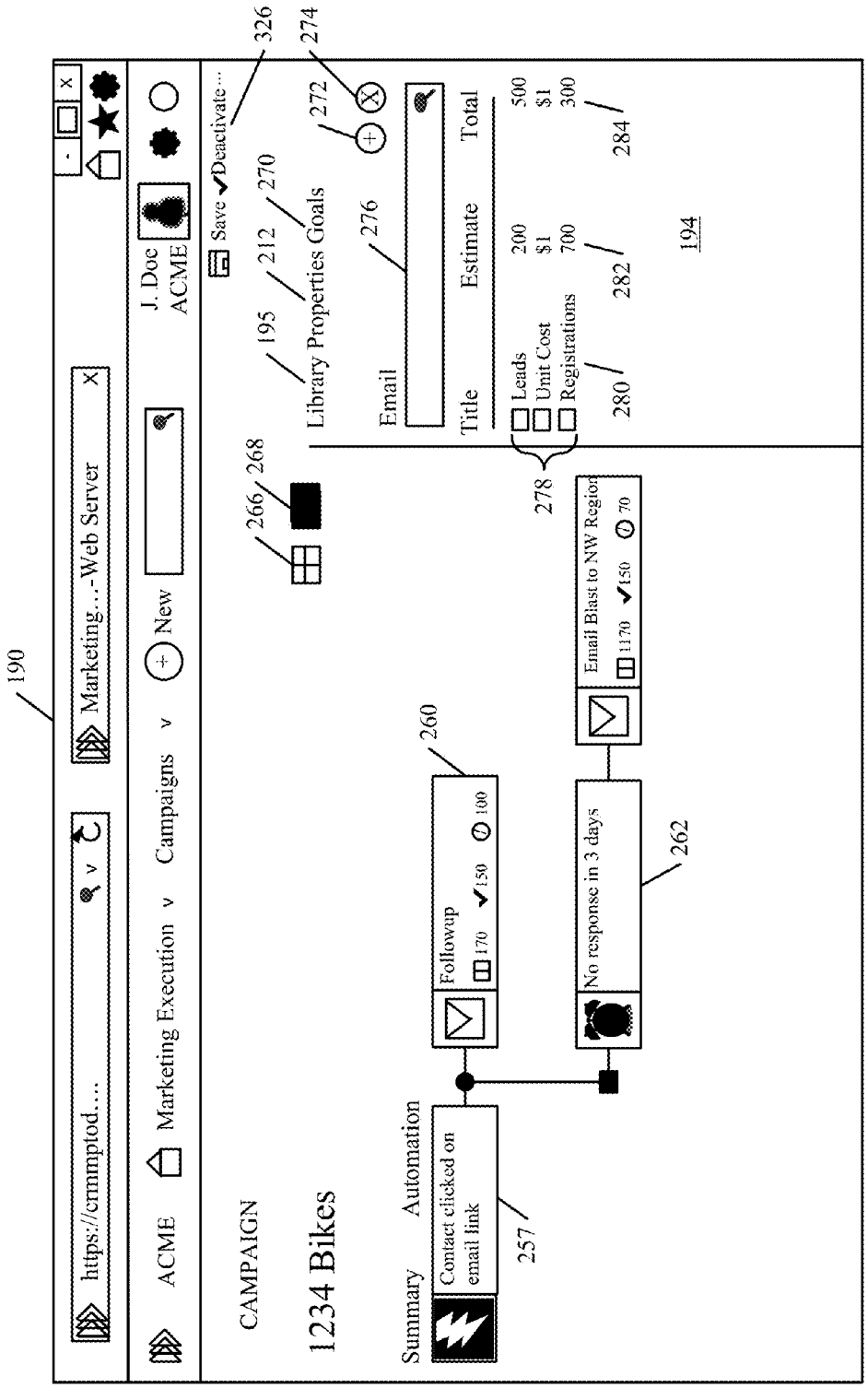

FIGS. 3O and 3P are exemplary user interface displays that are similar to those discussed above with respect to FIGS. 3K and 3L. However, FIGS. 3O and 3P show that the metrics corresponding to each action have now been updated, because the marketing campaign is actually being performed. Thus, for instance, the metrics shown in display element 208 are updated to indicate that 1500 prospects have navigated to another page from the e-mail, 1340 prospects have read the e-mail and 160 have deleted it. The metrics corresponding to the other actions are updated as well.

FIG. 3Q shows a user interface display that is similar to the user interface display shown in FIG. 3N above, except that pane 192 in FIG. 3O shows the marketing campaign in the expanded form, instead of in summary form, and pane 194 has been updated to show the actual collected values 284 corresponding to the goals and objectives for the overall marketing campaign. Thus, when the user 104 accesses system 102 and displays the information corresponding to the marketing campaign, the user 104 can see not only the performance for each action in the marketing campaign, but the user 104 can also quickly see how the marketing campaign is performing against the goals and objectives that were previously defined.

Referring again to FIG. 2, at any point, the user can provide user inputs to modify the marketing campaign. This can be done, for instance, by deactivating the marketing campaign, changing the marketing campaign flow in pane 192, and reactivating it. Receiving modifications to the campaign is indicated by block 322 in FIG. 2, and modifying the campaign accordingly is indicated by block 324.

It will also be appreciated that the user can stop or otherwise deactivate the campaign by actuating deactivate user input mechanism 326. Similarly, the campaign can end on its own, such as by meeting an end date that the user specified when setting up the campaign. Regardless of how it is ended, system 102 can determine that the campaign is ended, as indicated by block 328. System 102 can then store the campaign for later use as indicated by block 330. This can be done so that the campaign can be reused as indicated by block 332, or so that it can be further analyzed as indicated by block 334, or for other reasons as indicated by block 336. The performance results (such as all the collected and calculated metrics) can also be stored or output for other use as well. This indicated by block 338.

It can thus be seen that system 102 provides a system that displays a single display (or cockpit) that supports not only creating a marketing campaign, but also the monitoring and managing of the campaign. It includes real-time analytics for each of the actions within a marketing campaign so that user 104 can know how prospects are reacting to each portion of the campaign as well as the state of the campaign, as it is being executed, in real time. The user can view the actual performance data for each of the actions as well as for the entire campaign. The user can also compare the data against goals or objectives for the campaign, across multiple configurable metrics, and against actual values for each of those metrics. A clearly defined and guided grid-based view is provided to create the overall marketing campaign flow and the flow chart connections can be automatically generated, or specified by the user. Thus, in-line properties of segments, actions and responses can all be defined without navigating to a different user interface so that user 104 can view the full context of the marketing campaign that they are currently creating. The user can monitor its performance, once created, from the same display. The user can also activate the campaign, deactivate it, reconfigure it and re-activate it, all from the same display.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
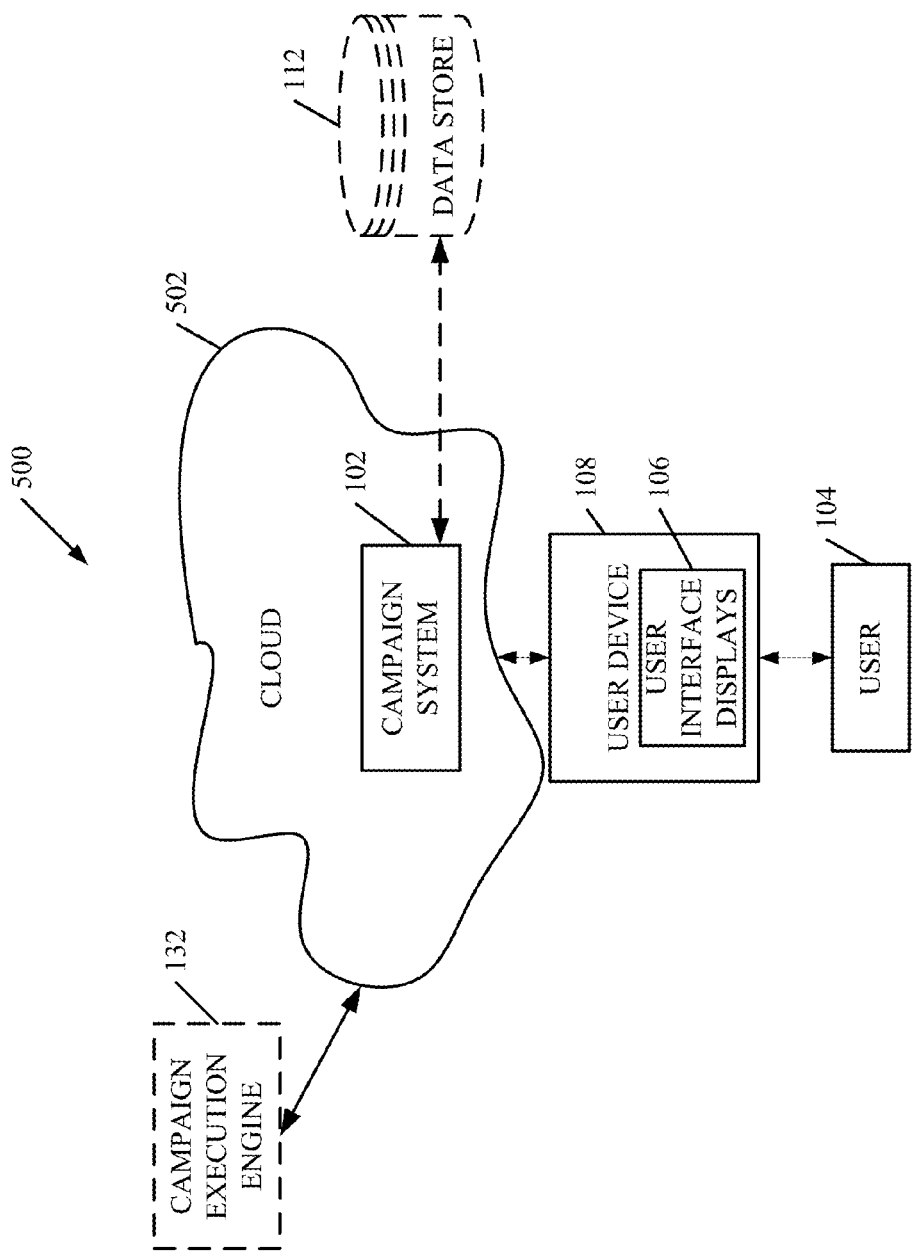
FIG. 4 is a block diagram of the architecture shown in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 4, some items are similar to those shown in FIG. 1 and they are similarly numbered. FIG. 4 specifically shows that system 102 can be located in cloud 502 (which can be public, private, or a combination where portions are public while others are private). Therefore, user 104 uses a user device 108 to access those systems through cloud 502.

FIG. 4 also depicts another embodiment of a cloud architecture. FIG. 4 shows that it is also contemplated that some elements of system 102 are disposed in cloud 502 while others are not. By way of example, data store 112 can be disposed outside of cloud 502, and accessed through cloud 502. In another embodiment, campaign execution engine 132 is also outside of cloud 502. Regardless of where they are located, they can be accessed directly by device 108, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
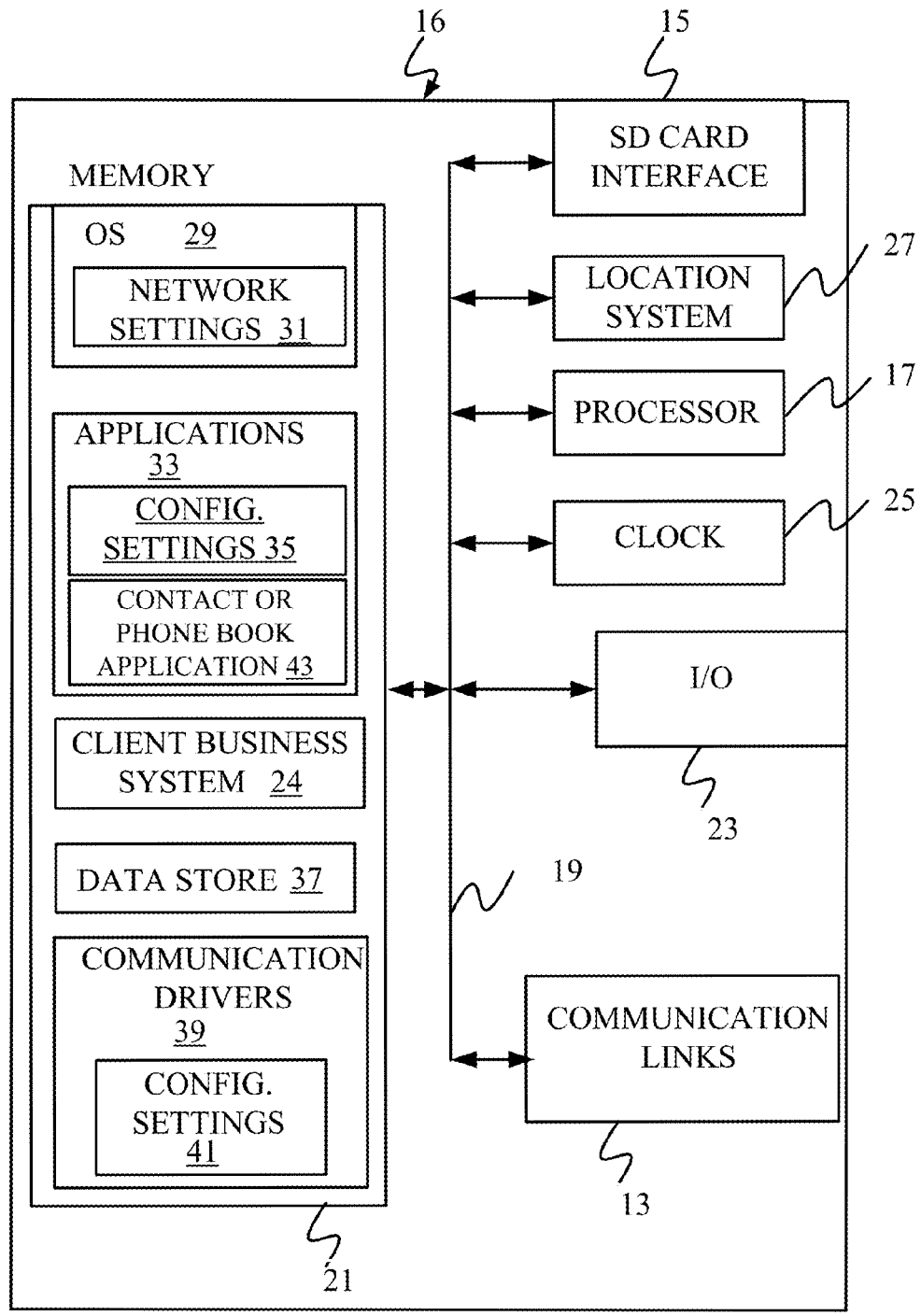
FIGS. 5-10 show various embodiments of mobile devices.

FIG. 5 is a simplified block diagram of one illustrative embodiment of a handheld or mobile computing device that can be used as a user's or client's hand held device 16, in which the present system (or parts of it) can be deployed. FIGS. 6-10 are examples of handheld or mobile devices.

FIG. 5 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 110 or 136 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 6:
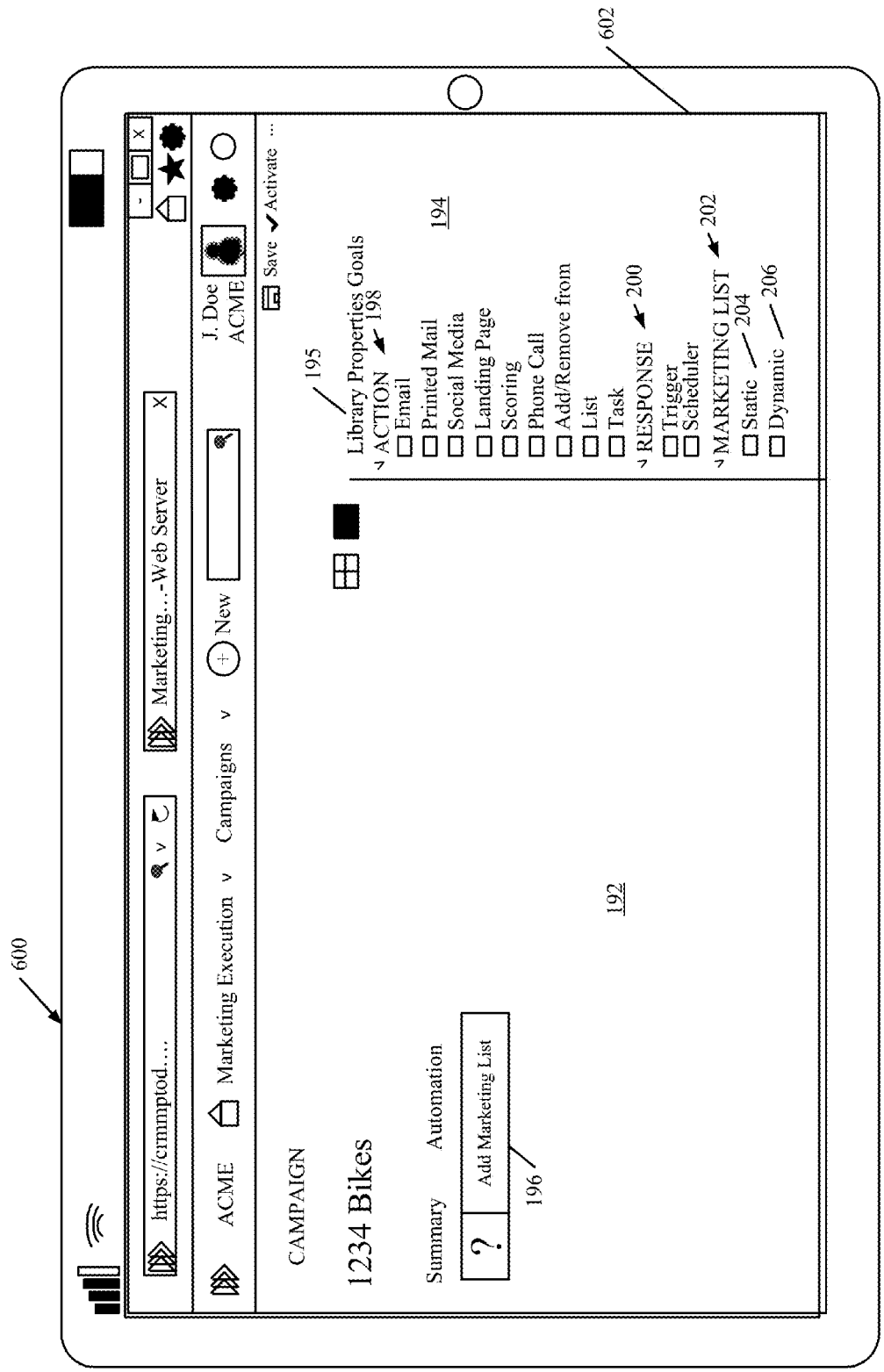

FIG. 6 shows one embodiment in which device 16 is a tablet computer 600. In FIG. 6, computer 600 is shown with user interface display (from FIG. 3A) displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 7:
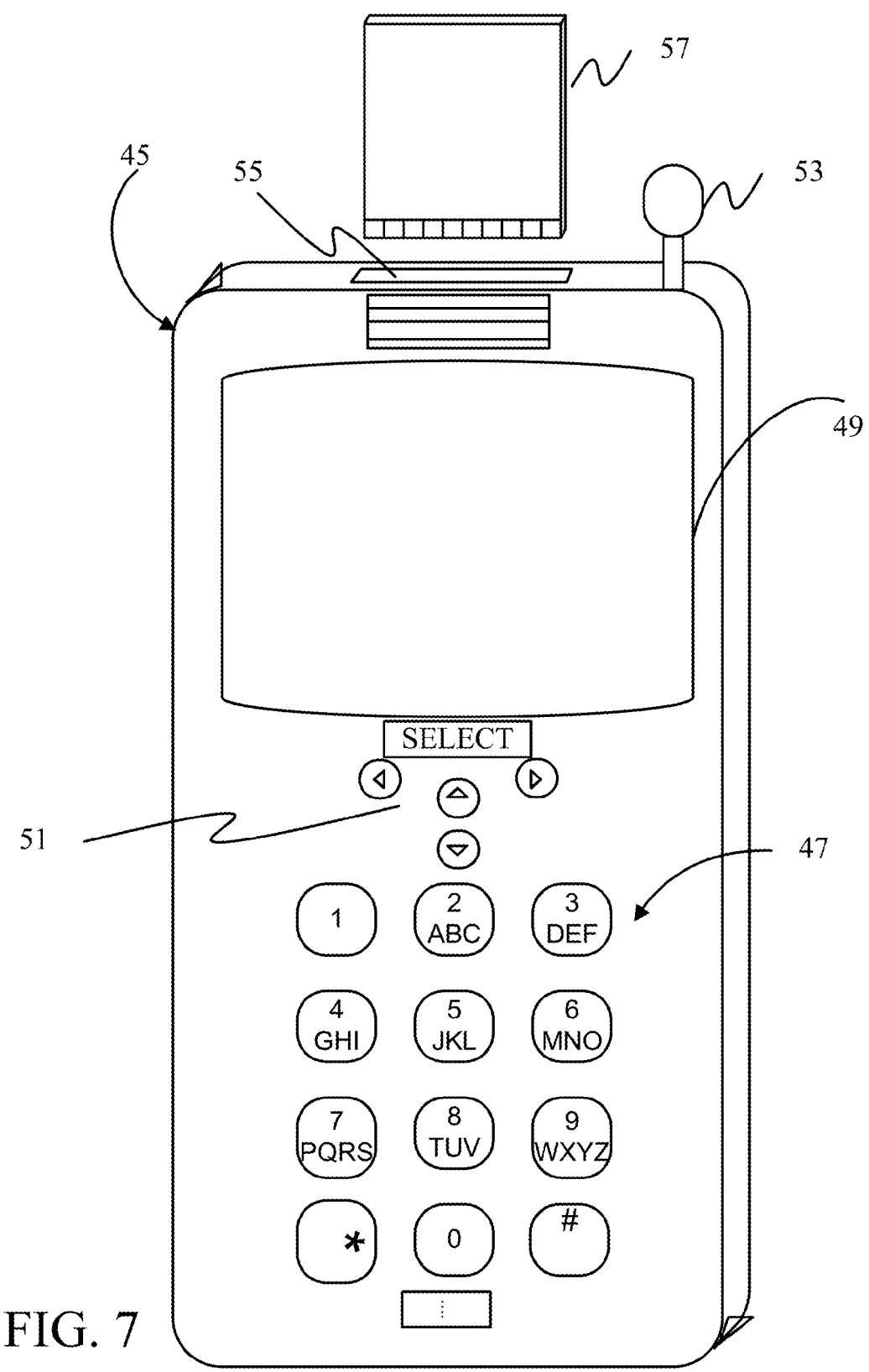
Figure 8:
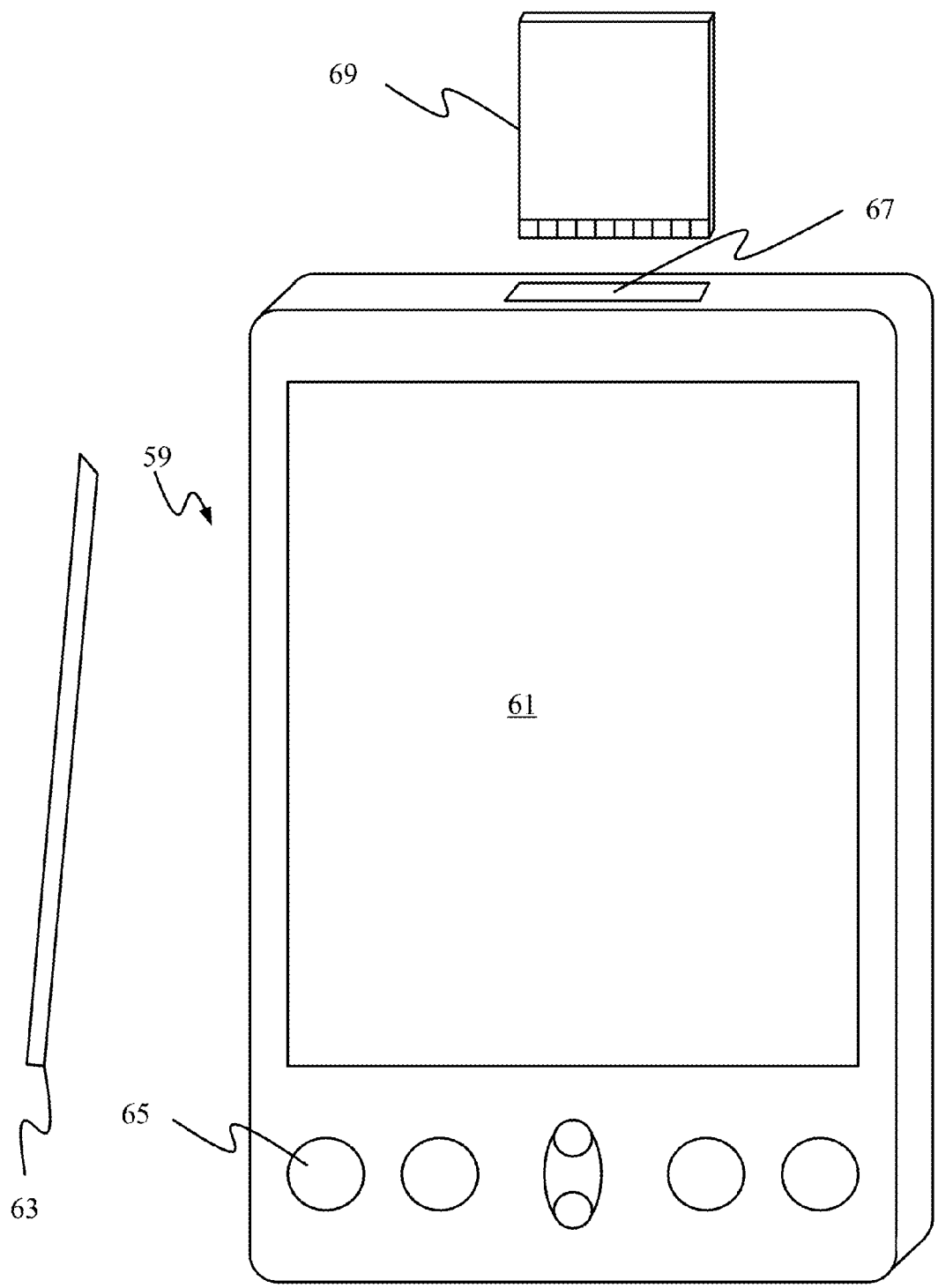

FIGS. 7 and 8 provide additional examples of devices 16 that can be used, although others can be used as well. In FIG. 7, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 8 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 9:
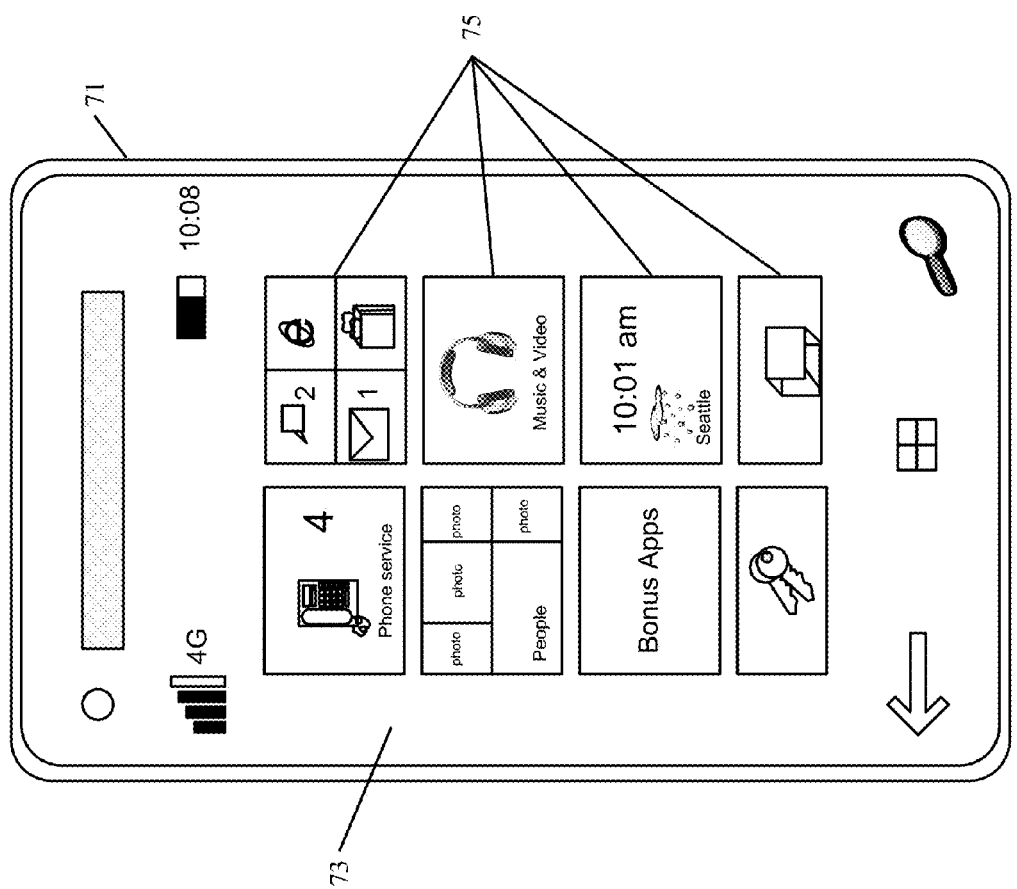
Figure 10:
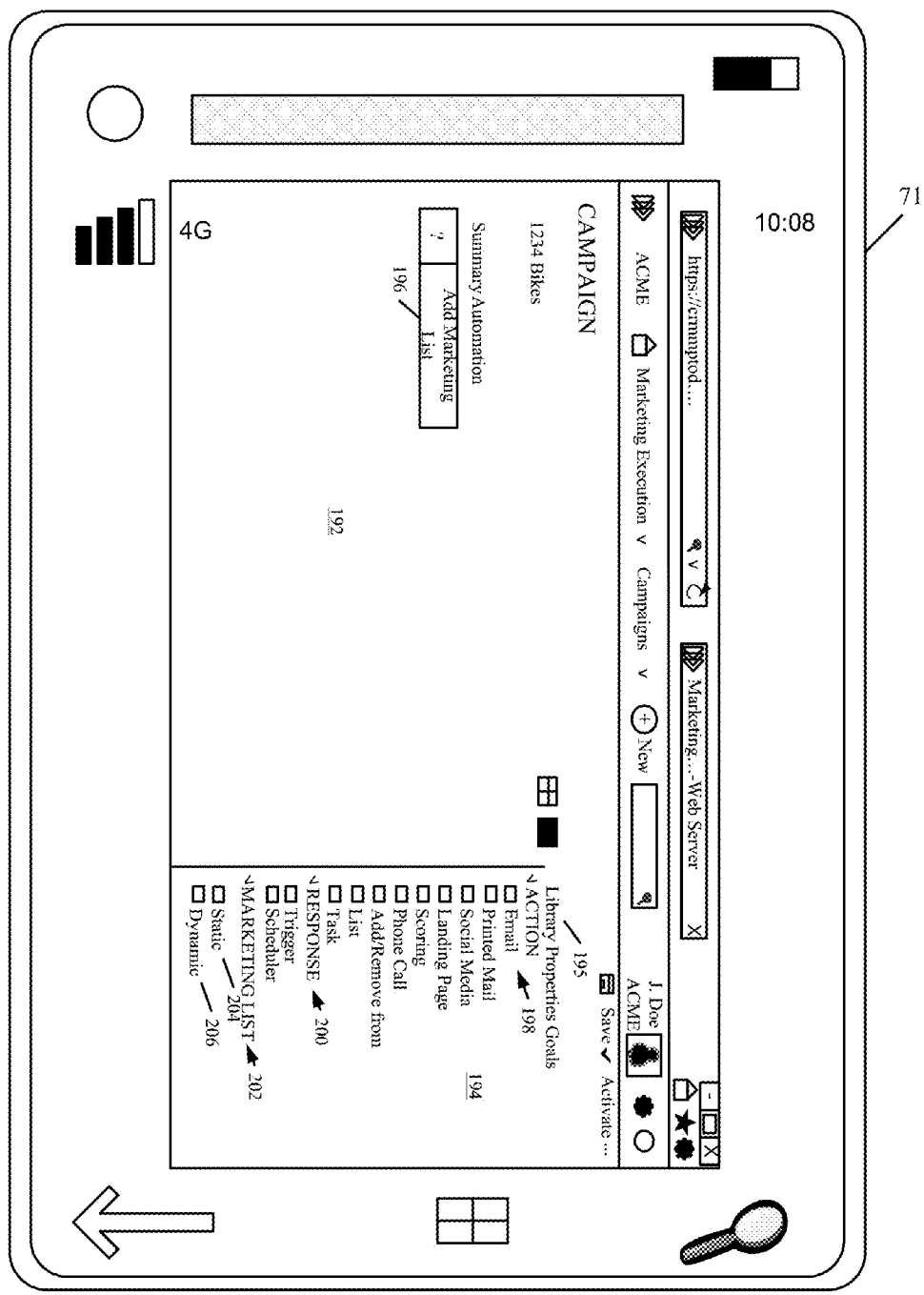

FIG. 9 is similar to FIG. 7 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. FIG. 10 shows phone 71 with the user interface display of FIG. 3A displayed on it.

Note that other forms of the devices 16 are possible.

Figure 11:
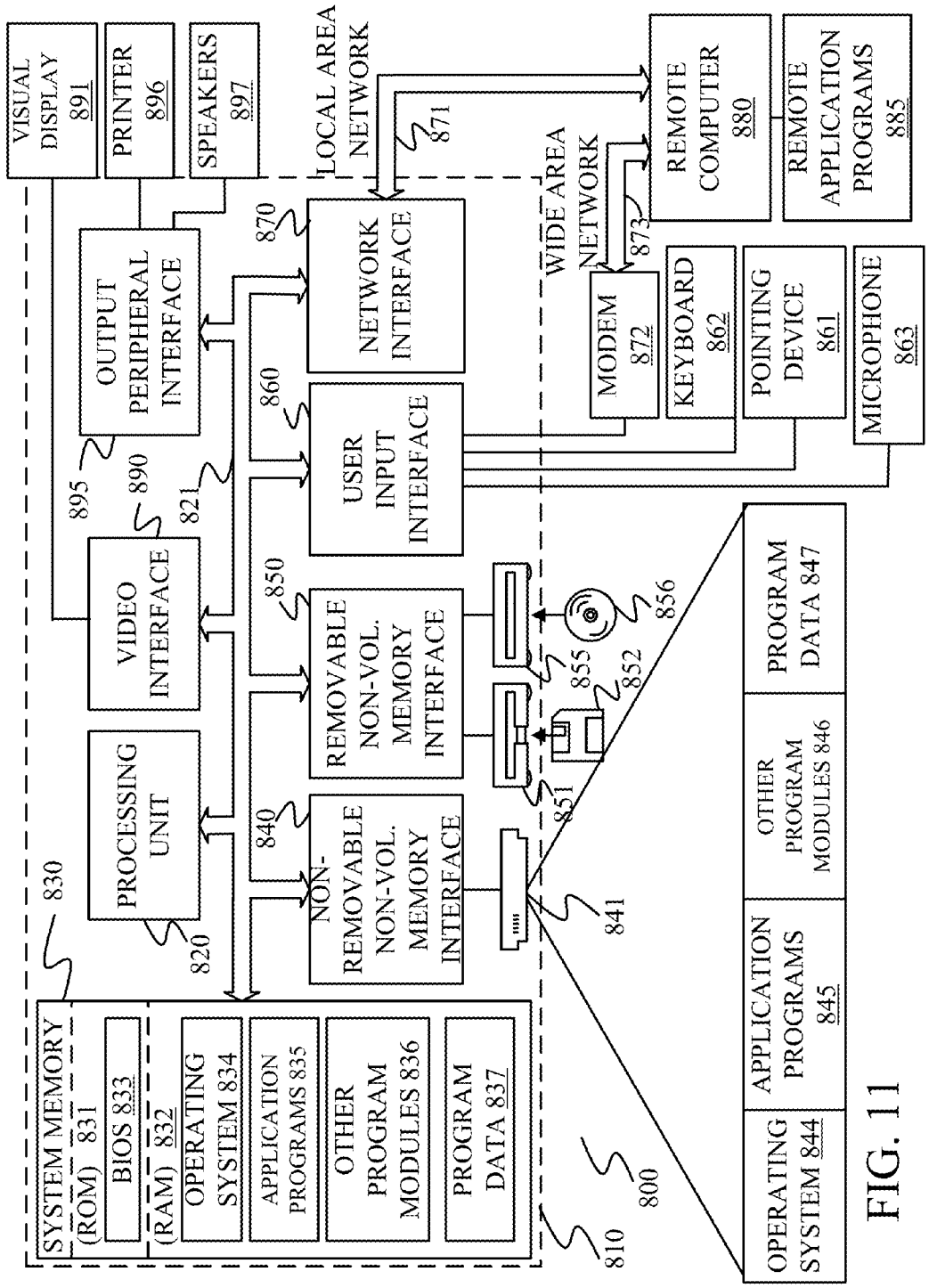
FIG. 11 is a block diagram of one illustrative computing environment.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 110 or 136), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
    generating a representation of a campaign configuration user interface display including a campaign creation user input mechanism, an action element pane, and an automation flow pane, wherein the action element pane includes a plurality of action display elements, each of the action display elements corresponding to an action executable by a campaign execution engine in association with a campaign;
    receiving an indication of user actuation of the campaign creation user input mechanism;
    based on the indication of user actuation of the campaign creation user input mechanism,
        selecting a set of the action display elements,
        identifying a display order for the action display elements, and
        updating the representation of the campaign configuration user interface display to add the selected set of action display elements to the automation flow pane based on the display order, wherein the action display elements in the selected set are displayed at positions within the automation flow pane that are indicative of an order of execution for the corresponding actions, that correspond to the selected set of action display elements, within the campaign, the automation flow pane including visual links that connect the selected set of action display elements in the automation flow pane to visually represent the order in the automation flow pane;
    using the campaign execution engine to automatically generate instructions representing the actions in the campaign and send the instructions to at least one computing system, wherein the instructions control the at least one computing system to perform the actions in the order represented by the visual links that connect the selected set of action display elements; and
    while the campaign is being executed by the campaign execution engine,
        receiving a set of performance metrics, each performance metric corresponding to a particular one of the actions in the campaign and indicating the performance of the particular action; and
        automatically updating the representation of the campaign configuration user interface display to include the set of performance metrics, wherein each performance metric is provided on the campaign configuration user interface display such that it is visually associated with the action display element that represents the action that corresponds to the performance metric.

2. The computer-implemented method of claim 1 wherein generating the representation of a campaign configuration user interface display comprises:
    generating the representation to include, in the action element pane, a set of user selectable trigger display elements, each corresponding to a different response that is triggered such that a following action.

3. The computer-implemented method of claim 2 wherein receiving an indication of user actuation of the campaign creation user input mechanism comprises:
    receiving an indication of a user selection;
    based on the indication of the user selection, selecting one of the pluralityof the action display elements.

4. The computer-implemented method of claim 3 and further comprising:
    prior to using the campaign execution engine to generate the instructions, receiving an indication of a user activation input activating the campaign, and wherein using the execution engine to perform the instructions is performed in response to receiving the indication of the user activation input.

5. The computer-implemented method of claim 3 and further comprising:
    automatically collecting individual action metrics indicative of the performance of corresponding individual actions in the campaign, as the campaign is being executed, and wherein automatically updating comprises:
        automatically updating the representation of the action display elements in the automation flow pane to show, on each of the action display elements on the automation flow pane, the corresponding individual action metric.

6. The computer-implemented method of claim 1, wherein the at least one computing system comprises at least one of:
    a messaging system;
    a real-time communication system; or
    a social network system.

7. The computer-implemented method of claim 6 wherein the at least one computing system comprises a plurality of different computing systems, and wherein the performance metrics are received and displayed, on the campaign configuration user interface display, in real-time.

8. The computer-implemented method of claim 3 wherein receiving an indication of user selection of a plurality of the user selectable action display elements comprises:

for each selected action display element, receiving an indication of a detail user input and, based on the indication of the detail user input, defining details of how the corresponding action is to be performed during execution of the campaign.

9. The computer-implemented method of claim 1 and further comprising:
generating a representation of a goals user input mechanism on the campaign creation user interface display;
receiving an indication of user actuation of the goals user input mechanism; and
based on the indication of user actuation of the goals user input mechanism, generating a representation of a goal definition user interface display with a goal definition user input mechanism;
receiving an indication of user actuation of the goal definition user input mechanism; and
based on the indication of user actuation of the goal definition user mechanism, define goals for the campaign.

10. The computer-implemented method of claim 9 wherein automatically collecting the metrics comprises:
automatically collecting overall campaign metrics indicative of performance of the campaign, in terms of the goals.

11. The computer-implemented method of claim 10 and further comprising:
generating a representation of a goals display that indicates how the campaign metrics compare against the goal; and
automatically updating the goals display as the campaign is executed.

12. The computer-implemented method of claim 1 and wherein generating the representation of the campaign configuration user interface display comprises:
generating the representation to include, in the action element pane, a set of user selectable segment display elements, each corresponding to a different marketing segment.

13. The computer-implemented method of claim 1, wherein the campaign configuration user interface display includes a reconfiguration user input mechanism, and the method further comprises:
receiving an indication of user actuation of the reconfiguration user input mechanism;
based on the indication of user actuation of the reconfiguration user input mechanism, identifying a reconfiguration for the campaign, the reconfiguration comprising at least one of:
a change to the action in the campaign; or
a change to the order for the action in the campaign;
automatically executing the reconfiguration for the campaign by automatically generating and sending instructions to the at least one computing system; and
automatically updating the representation of the campaign display, as the campaign is being reconfigured, to show metrics indicative of the performance of the reconfigured campaign.

14. An electronic campaign system, comprising:
a processor; and
memory storing instructions executable by the processor, wherein the instructions configure the electronic campaign system to:
generate a representation of a campaign configuration display with an action element pane and an automation flow pane, the action element pane including a set of user selectable action display elements;
receive an indication of a user action input that selects a subset of e set of action display elements;
based on the indication of the user action input, identify a display rder for the subset of action display elements;
update the representation of the campaign configuration display to add the subset of action display elements to the automation flow plane based on the display order, each of the subset of action display elements corresponding to a particular action executable in association with a campaign, wherein the subset of action display elements are connected by visual links in the automation flow pane to visually represent an order in the automation flow pane;
automatically execute the campaign by generating instructions representing the actions in the campaign and sending the instructions to at least one computing system, wherein the instructions control the at least one computing system to perform the actions in the order represented by the visual links in the automation flow pane;
while the campaign is being executed,
receive a set of performance metrics, each performance metric corresponding to a particular one of the actions in the campaign and indicating the performance of the particular action; and
automatically update the representation of the campaign configuration display to include the set of performance metrics, wherein each performance metric, in the set of performance metrics, is provided on the campaign configuration display such that it is visually associated with the action display element that represents the action that corresponds to the performance metric.

15. The electronic campaign system of claim 14 wherein the at least one computing system comprises a plurality of different computing systems, the plurality of different computing systems comprising one or more of:
a messaging system;
a real-time communication system; or
a social network system.

16. A computer-implemented campaign system comprising:
a processor; and
memory storing instructions executable by the processor, wherein the instructions configure the computer-implemented campaign system to:
generate a representation of a campaign display having a campaign creation user input mechanism, and a first pane that displays a plurality of action display elements corresponding to a plurality of campaign actions, each action display element corresponding to a different one of the campaign actions;
receive an indication of user actuation of the campaign creation user input mechanism;
based on the indication of user actuation of the campaign creation user input mechanism,
select a set of the action display element,
identify a display order for the set of action displayed elements, and
update the representation of the campaign display to include the set of user selectable action display elements in a second pane based on the display order, wherein the display order defines positions within the second pane that are indicative of an order of execution for an identified set of campaign actions, identified from the plurality of campaign actions, that correspond to the selected set of action display elements;

automatically configure a plurality of different runtime computing systems to execute the campaign by performing the set of campaign actions in the order indicated by the plurality of action display elements on the second pane; and while the campaign is being executed,
   automatically collect a set of performance metrics indicative of a performance of the campaign, each performance metric corresponding to a particular one of the campaign actions and indicating the performance of the particular campaign action; and
   automatically update the representation of the action display elements on the second pane, to show the corresponding performance metrics such that each performance metric is visually associated with the action display element that represents the particular one of the campaign actions that corresponds to the performance metric.

17. The computer-implemented campaign system of claim 16, wherein the instructions configure the computer-implemented campaign system to:
   for each selected action display element, receive user detail inputs defining details of how the corresponding campaign action is to be performed during execution of the campaign.

18. The electronic campaign system of claim 14 wherein the instructions configure the electronic campaign system to:
   receive an indication of a user reconfiguration input that changes the display order of the subset of action display elements within the automation flow pane.

19. The electronic campaign system 18 wherein the instructions configure the electronic campaign system to:
   based on the indication of the user reconfiguration input, update the visual links in the automation flow pane to indicate a reconfigured order in the automation flow pane.

20. The electronic campaign system of claim 19 wherein the instructions configure the electronic campaign system to:
   automatically execute the campaign by generating instructions, wherein the instructions control the at least one computing system to perform the actions in the reconfigured order represented by the updated visual links in the automation flow pane.

* * * * *